(12) United States Patent
Funaki et al.

(10) Patent No.: US 8,975,349 B2
(45) Date of Patent: Mar. 10, 2015

(54) CATIONICALLY POLYMERIZABLE RESIN COMPOSITION AND CURED OBJECT OBTAINED THEREFROM

(75) Inventors: Yoshinori Funaki, Himeji (JP); Kiyoharu Tsutsumi, Himeji (JP); Tomoaki Mahiko, Himeji (JP); Naoko Araki, Himeji (JP)

(73) Assignee: Daicel Corporation, Osaka-Shi (JP)

( * ) Notice: Subject to any disclaimer, the term of this patent is extended or adjusted under 35 U.S.C. 154(b) by 627 days.

(21) Appl. No.: 13/376,082

(22) PCT Filed: May 20, 2010

(86) PCT No.: PCT/JP2010/058509
§ 371 (c)(1),
(2), (4) Date: Dec. 2, 2011

(87) PCT Pub. No.: WO2010/140481
PCT Pub. Date: Dec. 9, 2010

(65) Prior Publication Data
US 2012/0077946 A1 Mar. 29, 2012

(30) Foreign Application Priority Data
Jun. 5, 2009 (JP) .................... 2009-136172

(51) Int. Cl.
C08F 224/00 (2006.01)
C08G 63/66 (2006.01)
C08G 59/32 (2006.01)
C08G 65/18 (2006.01)
C08G 65/22 (2006.01)

(52) U.S. Cl.
CPC ............ *C08G 59/3209* (2013.01); *C08G 65/18* (2013.01); *C08G 65/22* (2013.01)
USPC .................... 526/273; 526/266; 528/361

(58) Field of Classification Search
USPC .................... 528/361; 526/266, 273
See application file for complete search history.

(56) References Cited

U.S. PATENT DOCUMENTS

| | | | |
|---|---|---|---|
| 5,605,941 A | 2/1997 | Steinmann et al. | |
| 7,074,970 B2 | 7/2006 | Ishii et al. | |
| 7,271,297 B2 | 9/2007 | Ishii et al. | |
| 2003/0083529 A1 | 5/2003 | Ishii et al. | |
| 2006/0205957 A1 | 9/2006 | Ishii et al. | |

FOREIGN PATENT DOCUMENTS

| | | | | |
|---|---|---|---|---|
| JP | 4-170486 A | | 6/1992 | |
| JP | 04170486 A | * | 6/1992 | ........... C09D 201/06 |
| JP | 7-233112 A | | 9/1995 | |
| JP | 10-25262 A | | 1/1998 | |
| JP | 10-316670 A | | 12/1998 | |
| JP | 11-171967 A | | 6/1999 | |
| JP | 2001-181385 A | | 7/2001 | |
| JP | 2003-26774 A | | 1/2003 | |
| JP | 2003-73321 A | | 3/2003 | |
| JP | 2006-232988 A | | 9/2006 | |
| JP | 2008-266308 A | | 11/2008 | |
| JP | 2009-138116 | * | 6/2009 | ............ C08G 65/14 |
| JP | 2009-138116 A | | 6/2009 | |

OTHER PUBLICATIONS

International Search Report for PCT/JP2010/058509, mailed on Aug. 17, 2010.

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

Disclosed is a cationically polymerizable resin composition which includes an oxetane-ring-containing vinyl ether compound (A) and/or an alicyclic-epoxy-containing vinyl ether compound (B); and an oligomer or polymer (C) having a molecular weight of 500 or more, being liquid at 0° C., and containing at least one of structures represented by following Formulae (1a) to (1f), wherein $R^x$ represents hydrogen atom or methyl group; $R^1$ to $R^3$ each independently represent a hydrocarbon group having 1 to 5 carbon atoms; "a" is an integer of from 0 to 5; and "b" is 1 or 2. This cationically polymerizable resin composition has a low viscosity, is easy to work, cures extremely rapidly upon irradiation with light, and can give a cured object excellent in flexibility, thermal stability, and bendability after heat treatment.

[Chem. 1]

(1a)

(1b)

-continued
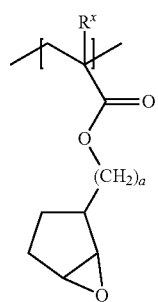
(1c)
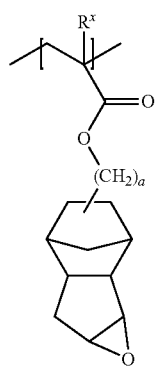
(1d)
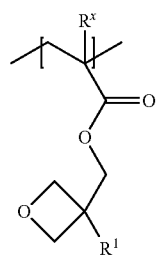
(1e)
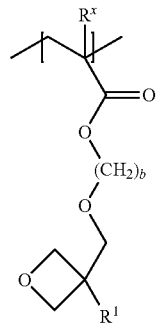
(1f)
6 Claims, 1 Drawing Sheet

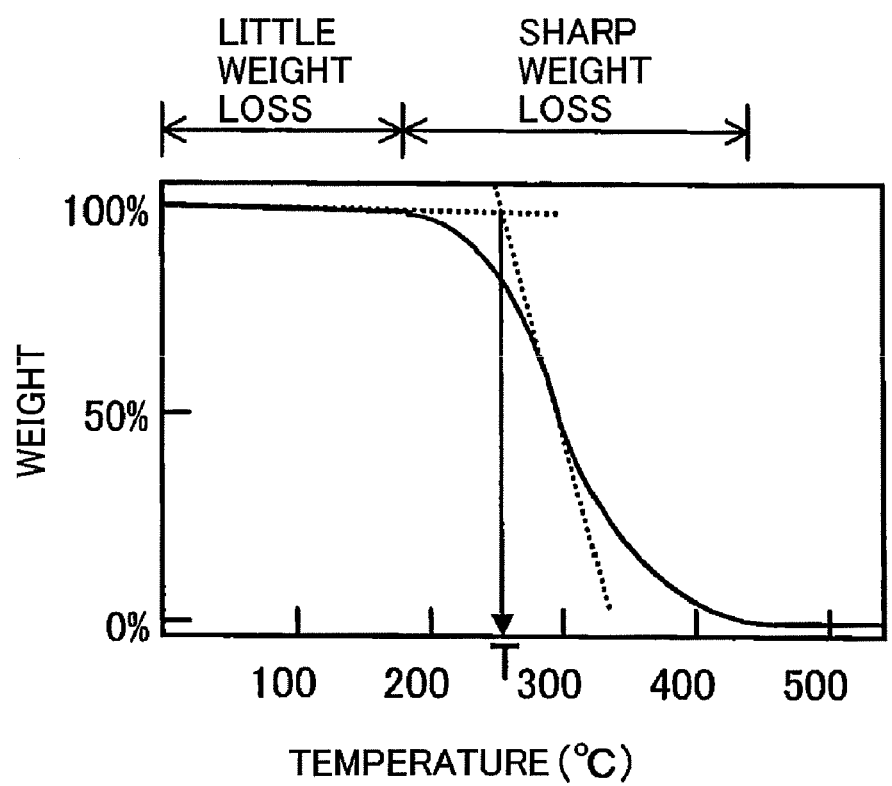

CATIONICALLY POLYMERIZABLE RESIN COMPOSITION AND CURED OBJECT OBTAINED THEREFROM

TECHNICAL FIELD

The present invention relates to a cationically polymerizable resin composition and a cured object obtained therefrom, which are useful in fields where both flexibility and thermal stability are required, such as waveguides [e.g., optical waveguides and photoelectric hybrid circuit boards], optical fibers, base films and protective films for solar cells, base films and protective films for flexible displays, base films and protective films for organic electroluminescent (organic EL) devices, optically transparent sealants, adhesives, ink-jet inks, color filters, nanoimprinting, and flexible circuit boards.

BACKGROUND ART

In recent high-speed, high-density signal transmission between electronic devices or between circuit boards, a customary transmission technique through electric wirings has began to reveal limitations in realization of high speed and high density signal transmission, because mutual interference between signals and electromagnetic noise from surroundings constitute barriers. In order to overcome such limitations, a technology for optically connecting between electronic devices or between circuit boards, a so-called optical interconnection, is being examined. A flexible optical waveguide having satisfactory flexibility has been considered to be suitable as an optical path, because this can be easily connected with a device or substrate (board) and has satisfactory handleability.

Customary flexible optical waveguides have employed epoxy compounds. Such epoxy compounds, however, show poor polymerization reactivity (curability), high skin irritancy, and high toxicity and thereby have disadvantages in handleability and safety, although they give cured objects which excel in chemical resistance and adhesion. Independently, there has been an attempt to adopt polyimides to flexible optical waveguides, but the attempt has proved as being limited, because the polyimides should be prepared at high temperatures; they are significantly restricted in solvents when they are handled as polymers to form polymer solutions; and they are very expensive.

Japanese Unexamined Patent Application Publication (JP-A) No. H10-25262 and Japanese Unexamined Patent Application Publication (JP-A) No. 2003-73321 disclose some alicyclic vinyl ether compounds as polymerizable compounds. These compounds show low skin irritation potential and thereby have improved safety, but are still insufficient in thermal stability and optical transparency and need improvements.

Japanese Unexamined Patent Application Publication (JP-A) No. H10-316670 discloses a vinyl ether compound having an oxetane ring in the molecule. This compound, however, is not always satisfactory, because the compound, when having a long glycol chain, gives a cured object having flexibility but showing insufficient thermal stability and optical transparency; and the compound, when having a short glycol chain, gives a cured object having insufficient flexibility. Japanese Unexamined Patent Application Publication (JP-A) No. H07-233112 and Japanese Unexamined Patent Application Publication (JP-A) No. H11-171967 disclose vinyl ether compounds each including, in the molecule, an alicyclic epoxy group composed of a cyclohexane ring and an oxirane ring bonded to each other. The compounds, however, show poor flexibility and are difficult to be adopted to flexible optical waveguides and other uses where flexibility is required, although they excel in thermal stability, optical transparency, and curing rate.

Japanese Unexamined Patent Application Publication (JP-A) No. 2008-266308 discloses a vinyl ether compound containing an oxetane ring. This compound, however, has poor flexibility and is hardly applicable to flexible optical waveguides and other fields where flexibility is required, although the compound excels in thermal stability, optical transparency, and curing rate. Japanese Unexamined Patent Application Publication (JP-A) No. 2006-232988 discloses an example in which a cyclic ether compound containing a vinyl ether structure is added with an epoxidized polybutadiene having hydroxyl groups at both terminals. The resulting compound is, however, inferior in thermal stability and optical transparency to vinyl ethers further having a reactive cyclic ether in the same molecule, because the compound has only vinyl ether as a reactive group.

CITATION LIST

Patent Literature

PTL 1: Japanese Unexamined Patent Application Publication (JP-A) No. H10-25262
PTL 2: Japanese Unexamined Patent Application Publication (JP-A) No. 2003-73321
PTL 3: Japanese Unexamined Patent Application Publication (JP-A) No. H10-316670
PTL 4: Japanese Unexamined Patent Application Publication (JP-A) No. H07-233112
PTL 5: Japanese Unexamined Patent Application Publication (JP-A) No. H11-171967
PTL 6: Japanese Unexamined Patent Application Publication (JP-A) No. 2008-266308
PTL 7: Japanese Unexamined Patent Application Publication (JP-A) No. 2006-232988

SUMMARY OF INVENTION

Technical Problem

Accordingly, an object of the present invention is to provide a cationically polymerizable resin composition and a cured object obtained therefrom, which resin composition has a low viscosity, is easy to work, and extremely rapidly cures upon irradiation with light to give a cured object excellent in optical transparency, flexibility, thermal stability, and post-heat-treatment bendability (bendability after heat treatment). The cationically polymerizable resin composition according to the present invention is useful in the fields typically of waveguides, optical fibers, base films and protective films for solar cells, base films and protective films for flexible displays, base films and protective films for organic EL devices, optically transparent sealants, adhesives, ink-jet inks, color filters, nanoimprinting, and flexible circuit boards (flexible wiring boards).

Solution to Problem

After intensive investigations to achieve the object, the present inventors have found a cationically polymerizable resin composition which contains a vinyl ether compound having a cationically polymerizable cyclic ether and an oligomer or polymer of a specific structure having a functional group capable of reacting with the vinyl ether compound; and have found that this cationically polymerizable resin composition has a low viscosity, shows excellent workability, has an extremely high curing rate, and can give, through curing, a cured object excellent in flexibility, thermal stability, and post-heat-treatment bendability. The present invention has been made based on these findings.

Specifically, the present invention provides, in an aspect, a cationically polymerizable resin composition comprising a vinyl ether compound (A) containing an oxetane ring and/or a vinyl ether compound (B) containing an alicyclic epoxy group; and an oligomer or polymer (C) having a molecular weight of 500 or more, being liquid at 0° C., and containing at least one structure selected from structures represented by following Formulae (1a), (1b), (1c), (1d), (1e), and (1f):

[Chem. 1]

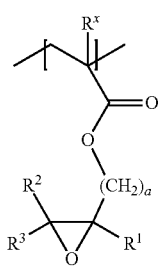
(1a)

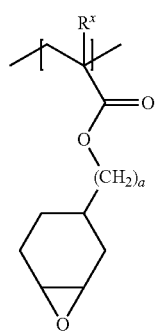
(1b)

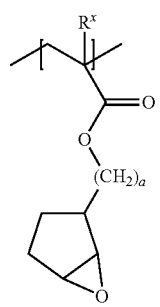
(1c)

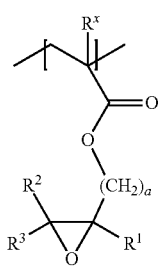
(1d)

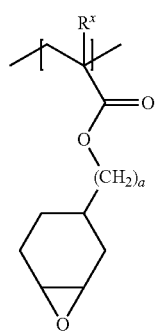
(1e)

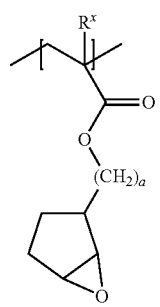
(1f)

wherein $R^x$ represents a hydrogen atom or a methyl group; $R^1$, $R^2$, and $R^3$ each independently represent a hydrocarbon group having 1 to 5 carbon atoms; "a" is an integer of from 0 to 5; and "b" is 1 or 2.

The oligomer or polymer (C) may further contain, in addition to the at least one selected from the structures represented by Formulae (1a) to (1f), a structure represented by following Formula (2):

[Chem. 2]

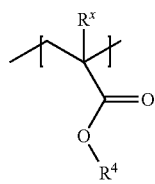
(2)

wherein $R^x$ represents a hydrogen atom or a methyl group; and $R^4$ represents a substituted or unsubstituted hydrocarbon group having 4 or more carbon atoms.

The cationically polymerizable resin composition may further include a compound (D) having only one functional group selected from epoxy group and oxetanyl group but having neither vinyl ether group nor vinyl polymer chain in the molecule.

The present invention provides, in another aspect, a cured object obtained by cationic polymerization of the cationically polymerizable resin composition.

The cured object may be in the form of a film or fiber.

Advantageous Effects of Invention

The cationically polymerizable resin composition according to the present invention includes a compound having both a cationically polymerizable cyclic ether (specifically, oxetane ring or alicyclic epoxy group) and a vinyl ether group in the same molecule, i.e., an oxetane-ring-containing vinyl ether compound (A) and/or an alicyclic-epoxy-containing vinyl ether compound (B); and an oligomer or polymer (C) which has a specific structure, has a functional group (specifically, oxetane group or epoxy group) capable of reacting with the cationically polymerizable cyclic ether, is liquid at 0° C., and has a molecular weight of 500 or more. The cationically polymerizable resin composition thereby has a low viscosity, is easy to work, and can extremely rapidly cure upon irradiation with light. The composition thereby gives a cured object with improved productivity, thus being advantageous. The composition, through curing, gives a cured object excellent in flexibility, thermal stability, and post-heat-treatment bendability. The resulting cured object also has satisfactory optical transparency. The cationically polymerizable resin composition according to the present invention is excellent as an optical material. The composition gives a cured object which can be easily connected with a device or substrate (circuit board) because of its satisfactory flexibility and which excels in handleability and workability. In addition, the composition shows low toxicity and low skin irritancy and has satisfactory safety. For these reasons, the cationically polymerizable resin composition according to the present invention is advantageously usable in the fields of waveguides, optical fibers, base films and protective films for solar cells, base films and protective films for flexible displays, base films and protective films for organic EL devices, optically transparent sealants, adhesives, ink-jet inks, color filters, nanoimprinting, and flexible circuit boards.

BRIEF DESCRIPTION OF DRAWINGS

FIG. 1 is an explanatory drawing illustrating how to evaluate the thermal stability of a cured object (schematic view of thermogravimetric results).

DESCRIPTION OF EMBODIMENTS

Oxetane-Ring-Containing Vinyl Ether Compound (A)

The vinyl ether compound (A) containing an oxetane ring (oxetane-ring-containing vinyl ether compound (A)) for use in the present invention is not limited, as long as being a compound having at least an oxetane ring and a vinyl ether structure in the molecule. Typical examples of the oxetane-ring-containing vinyl ether compound (A) include compounds represented by following Formula (3):

[Chem. 3]

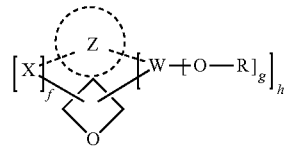

(3)

wherein Ring Z represents a non-aromatic carbocyclic ring which forms a spiro structure with the oxetane ring and which may be present or absent in the molecule; R represents a substituted or unsubstituted vinyl group represented by following Formula (4):

[Chem. 4]

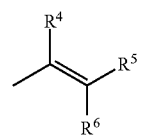

(4)

wherein $R^4$, $R^5$, and $R^6$ are the same as or different from one another and each represent a hydrogen atom or an alkyl group having 1 to 4 carbon atoms; W is a linkage group connecting between the substituted or unsubstituted vinyloxy group (—OR group) and the oxetane ring or Ring Z and represents a single bond or an organic group having a valency of (g+1); X is a substituent of the oxetane ring and Ring Z and represents a halogen atom, a substituted or unsubstituted hydrocarbon group, a protected or unprotected hydroxyl group, a protected or unprotected amino group, a protected or unprotected carboxyl group, a protected or unprotected sulfo group, an oxo group, a nitro group, a cyano group, or a protected or unprotected acyl group; "g" denotes 1 or 2; "f" denotes an integer of from 0 to 5; and "h" denotes 1 or 2, wherein, when "g", "f", and/or "h" is 2 or more, two or more substituents in the brackets may be the same as or different from each other.

When "g" and "h" are both 1 in the compounds, it is preferred that at least Ring Z is present; or X includes an aromatic or non-aromatic carbocyclic ring; or W includes an aromatic or non-aromatic carbocyclic ring.

The oxetane-ring-containing vinyl ether compound (A) for use in the present invention preferably further has an aromatic or non-aromatic carbocyclic ring in the molecule or has two or more vinyl ether structures in the molecule. Such a vinyl ether compound containing an oxetane ring and further having a carbocyclic ring in the molecule or having two or more vinyl ether structures in the molecule not only has an extremely high curing rate but also gives, through curing, a cured object excellent in properties such as optical transparency and thermal stability, thus being significantly advantageous.

In the oxetane-ring-containing vinyl ether compound (A), exemplary aromatic carbocyclic rings include benzene ring and naphthalene ring. Exemplary non-aromatic carbocyclic rings include cycloalkane rings such as cyclopropane ring, cyclobutane ring, cyclopentane ring, cyclohexane ring, cyclooctane ring, and cyclododecane ring, of which cycloalkane rings having 3 to about 15 members are preferred; and bridged alicyclic rings having about 6 to about 20 carbon atoms, such as decalin ring, adamantane ring, and norbornane ring. The oxetane-ring-containing vinyl ether compound (A)

may contain two or more aromatic or non-aromatic carbocyclic rings per molecule. The aromatic or non-aromatic carbocyclic ring(s) is often present at a linkage moiety connecting between the vinyl ether structure and the oxetane ring. The non-aromatic carbocyclic ring may form a Spiro structure with the oxetane ring.

The oxetane-ring-containing vinyl ether compound (A) for use in the present invention has only to have one vinyl ether structure when having an aromatic or non-aromatic carbocyclic ring (Ring Z), and does not have to have an aromatic or non-aromatic carbocyclic ring when having two or more vinyl ether structures. However, the oxetane-ring-containing vinyl ether compound (A) may also be one having an aromatic or non-aromatic carbocyclic ring and further having two or more vinyl ether structures per molecule.

In Formula (3), examples of the non-aromatic carbocyclic ring as Ring Z include the above-exemplified non-aromatic carbocyclic rings. Ring Z is preferably cyclopentane ring or cyclohexane ring.

In Formula (3), R represents a substituted or unsubstituted vinyl group represented by Formula (4). In Formula (4), $R^4$, $R^5$, and $R^6$ are the same as or different from one another and each represent a hydrogen atom or an alkyl group having 1 to 4 carbon atoms. Exemplary alkyl groups having 1 to 4 carbon atoms include linear alkyl groups having 1 to 4 carbon atoms, such as methyl, ethyl, propyl, and butyl, of which those having 1 to 3 carbon atoms are preferred; and branched-chain alkyl groups having 1 to 4 carbon atoms, such as isopropyl, isobutyl, s-butyl, and t-butyl, of which those having 1 to 3 carbon atoms are preferred. Among them, the groups $R^4$, $R^5$, and $R^6$ are each preferably a hydrogen atom or a methyl group. Typical examples of the group represented by Formula (4) include vinyl group, isopropenyl group, 1-propenyl group, 2-methyl-1-propenyl group, and 1,2-dimethyl-1-propenyl group.

In Formula (3), W is a linkage group connecting between the substituted or unsubstituted vinyloxy group (—OR group) and the oxetane ring or Ring Z and represents a single bond or an organic group having a valency of (g+1). The organic group is generally a group having a carbon atom at the bonding site with the adjacent oxygen atom. Preferred examples of the organic group include (i) hydrocarbon groups, and (ii) groups each composed of one or more hydrocarbon groups and at least one group selected from oxygen atom (—O—), sulfur atom (—S—), carbonyl group (—CO—), and amino group (—NH—).

The hydrocarbon groups include aliphatic hydrocarbon groups, alicyclic hydrocarbon groups, aromatic hydrocarbon groups, and hydrocarbon groups each composed of two or more of these groups bonded to each other.

When taking divalent hydrocarbon groups as an example, exemplary hydrocarbon groups include linear or branched-chain alkylene groups having 1 to about 20 carbon atoms, such as methylene, methylmethylene (ethylidene), ethylmethylene (propylidene), dimethylmethylene (isopropylidene), ethylmethylmethylene, ethylene, propylene, trimethylene, tetramethylene, and hexamethylene groups, of which those having 1 to about 10 carbon atoms are preferred, and those having 1 to about 6 carbon atoms are more preferred; linear or branched-chain alkenylene groups having 2 to about 20 carbon atoms, such as propenylene group, of which those having 2 to about 10 carbon atoms are preferred, and those having 2 to about 6 carbon atoms are more preferred; cycloalkylene groups having 3 to about 20 members, such as 1,3-cyclopentylene, 1,2-cyclohexylene, 1,3-cyclohexylene, and 1,4-cyclohexylene groups, of which those having 3 to about 15 members are preferred, and those having about 5 to about 8 members are more preferred; cycloalkylidene groups having 3 to about 20 members, such as cyclopropylene, cyclopentylidene, and cyclohexylidene groups, of which those having 3 to about 15 members are preferred, and those having about 5 to about 8 members are more preferred; arylene groups such as 1,2-phenylene, 1,3-phenylene, and 1,4-phenylene groups; and benzylidene group.

The hydrocarbon groups may be substituted with one or more substituents. Exemplary substituents herein include protected or unprotected hydroxyl groups, protected or unprotected hydroxymethyl groups, protected or unprotected amino groups, protected or unprotected carboxyl groups, protected or unprotected sulfo groups, halogen atoms, oxo groups, cyano groups, nitro groups, heterocyclic groups, hydrocarbon groups, and haloalkyl groups. Protecting groups for use herein may be protecting groups customarily used in organic syntheses.

The heterocyclic groups as the substituents include heterocyclic groups having 3 to about 15 members and including at least one heteroatom selected from nitrogen atoms, oxygen atoms, and sulfur atoms, of which heterocyclic groups having 5 to 8 members are preferred.

The hydrocarbon groups as the substituents include aliphatic hydrocarbon groups, alicyclic hydrocarbon groups, aromatic hydrocarbon groups, and groups each composed of two or more of these bonded to each other. Exemplary aliphatic hydrocarbon groups include alkyl groups having 1 to about 20 carbon atoms, of which those having 1 to about 10 carbon atoms are preferred, and those having 1 to about 3 carbon atoms are more preferred; alkenyl groups having 2 to about 20 carbon atoms, of which those having 2 to about 10 carbon atoms are preferred, and those having 2 to about 3 carbon atoms are more preferred; and alkynyl groups having 2 to about 20 carbon atoms, of which those having 2 to about 10 carbon atoms are preferred, and those having 2 to about 3 carbon atoms are more preferred. Exemplary alicyclic hydrocarbon groups include cycloalkyl groups having 3 to about 20 members, of which those having 3 to about 15 members are preferred, and those having about 5 to about 8 members are more preferred; cycloalkenyl groups having 3 to about 20 members, of which those having 3 to about 15 members are preferred, and those having about 5 to about 8 members are more preferred; and bridged hydrocarbon groups such as perhydronaphth-1-yl group, norbornyl, adamantyl, and tetracyclo[4.4.0.1$^{2,5}$.1$^{7,10}$]dodec-3-yl groups. Exemplary aromatic hydrocarbon groups include aromatic hydrocarbon groups having about 6 to about 14 carbon atoms, of which those having about 6 to about 10 carbon atoms are preferred. Examples of hydrocarbon groups each composed of an aliphatic hydrocarbon group and an alicyclic hydrocarbon group bonded to each other include cycloalkyl-alkyl groups (e.g., cycloalkyl-alkyl groups whose cycloalkyl moiety having 3 to 20 carbon atoms, and whose alkyl moiety having 1 to 4 carbon atoms), such as cyclopentylmethyl, cyclohexylmethyl, and 2-cyclohexylethyl groups. Exemplary hydrocarbon groups each composed of an aliphatic hydrocarbon group and an aromatic group bonded to each other include aralkyl groups such as aralkyl groups having 7 to 18 carbon atoms; and alkyl-substituted aryl groups, such as phenyl group or naphthyl group substituted with one to about four alkyl groups having 1 to 4 carbon atoms.

Examples of the haloalkyl groups as the substituents include haloalkyl groups having 1 to about 10 carbon atoms, such as chloromethyl, trifluoromethyl, 2,2,2-trifluoroethyl, and pentafluoroethyl groups, of which haloalkyl groups having 1 to 3 carbon atoms are preferred.

Preferred examples as W include groups each represented by following Formula (5):

[Chem. 5]

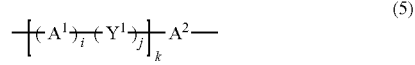
(5)

wherein $A^1$ represents a divalent hydrocarbon group; $Y^1$ represents oxygen atom (—O—), sulfur atom (—S—), carbonyl group (—CO—), or amino group (—NH—), or a group composed of two or more of these bonded to each other; $A^2$ represents a single bond or a hydrocarbon group having a valency of (g+1), where $A^2$ is bonded to —OR in Formula (3); "i" and "j" are each 0 or 1; and "k" denotes an integer of from 0 to 5.

Exemplary divalent hydrocarbon groups as $A^1$ are as with those as listed above. Among them, preferred as $A^1$ are linear or branched-chain alkylene groups having 1 to 6 carbon atoms, such as methylene, ethylene, propylene, isopyropylidene, trimethylene, and tetramethylene groups.

Preferred examples as $Y^1$ include oxygen atom (—O—), sulfur atom (—S—), carbonyl group (—CO—), amino group (—NH—), —COO—, —OCO—, —CONH—, and —NHCO—.

Exemplary hydrocarbon groups having a valency of (g+1) as $A^2$ are those as listed above. Among them, preferred examples as $A^2$ include single bond; linear or branched-chain alkylene groups having 1 to 6 carbon atoms (e.g., methylene, ethylene, propylene, isopyropylidene, trimethylene, and tetramethylene groups), cycloalkylene groups having 5 to 8 members (e.g., 1,3-cyclopentylene, 1,2-cyclohexylene, 1,3-cyclohexylene, and 1,4-cyclohexylene groups), cycloalkylidene groups having 5 to 8 members (e.g., cyclopropylene, cyclopentylidene, and cyclohexylidene groups), arylene groups (e.g., 1,2-phenylene, 1,3-phenylene, and 1,4-phenylene groups), and groups each composed of two or more of these bonded to each other.

W is particularly preferably a single bond, or a linear or branched-chain alkylene group having 1 to 6 carbon atoms, or a group composed of the alkylene group and oxygen atom or sulfur atom bonded to each other.

In Formula (3), X is a substituent of the oxetane ring and Ring Z and represents a halogen atom, a substituted or unsubstituted hydrocarbon group, a protected or unprotected hydroxyl group, a protected or unprotected amino group, a protected or unprotected carboxyl group, a protected or unprotected sulfo group, an oxo group, a nitro group, a cyano group, or a protected or unprotected acyl group. Exemplary protecting groups for use herein include protecting groups customarily used in organic syntheses.

Exemplary halogen atoms as X include fluorine, chlorine, and bromine atoms. Exemplary hydrocarbon groups in the "substituted or unsubstituted hydrocarbon group" as X include aliphatic hydrocarbon groups such as methyl, ethyl, propyl, isopropyl, butyl, isobutyl, s-butyl, t-butyl, hexyl, octyl, and decyl groups, of which alkyl groups having 1 to 10 carbon atoms are preferred, and alkyl groups having 1 to 5 carbon atoms are more preferred; alicyclic hydrocarbon groups such as cyclopentyl and cyclohexyl groups, of which cycloalkyl groups having 3 to 15 members are preferred; aromatic hydrocarbon groups such as phenyl and naphthyl groups; and groups each composed of two or more of these bonded to each other. Exemplary substituents which these hydrocarbon groups may have include halogen atoms such as fluorine, chlorine, and bromine atoms; alkyl groups having 1 to 4 carbon atoms, such as methyl group; haloalkyl groups having 1 to 5 carbon atoms, such as trifluoromethyl group; hydroxyl group; alkoxy groups having 1 to 4 carbon atoms, such as methoxy group; amino group; dialkylamino groups; carboxyl group; alkoxycarbonyl groups such as methoxycarbonyl group; nitro group; cyano group; and acyl groups such as acetyl group.

Exemplary acyl groups as X include aliphatic acyl groups having 1 to 6 carbon atoms, such as formyl, acetyl, propionyl, butyryl, isobutyryl, and pivaloyl groups; acetoacetyl group; and aromatic acyl groups such as benzoyl group.

When the oxetane-ring-containing vinyl ether compound (A) contains two or more Xs, they may be bound to each other to form a ring with a carbon atom constituting Ring Z or the oxetane ring in Formula (3). Examples of the ring include alicyclic carbocyclic rings such as cyclopentane ring, cyclohexane ring, and perhydronaphthalene ring (decalin ring); and lactone rings such as γ-butyrolactone ring and δ-valerolactone ring.

In Formula (3), "g" is 1 or 2 and is preferably 1; "f" is an integer of from 0 to 5 and is preferably an integer of from 0 to 3; and "h" is 1 or 2. When "f", "g", and/or "h" is 2 or more, two or more substituents in the brackets may be the same as or different from each other. When "g" and "h" are both 1, it is preferred that at least Ring Z is present, or X includes an aromatic or non-aromatic carbocyclic ring, or W includes an aromatic or non-aromatic carbocyclic ring.

Of the compounds represented by Formula (3), preferred are compounds represented by following Formula (3a), (3b), (3c) or (3d):

[Chem. 6]

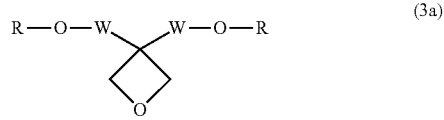
(3a)

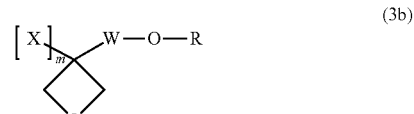
(3b)

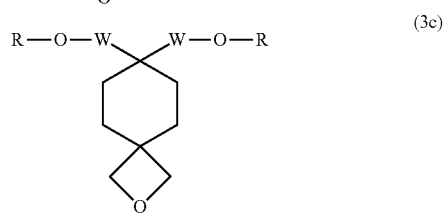
(3c)

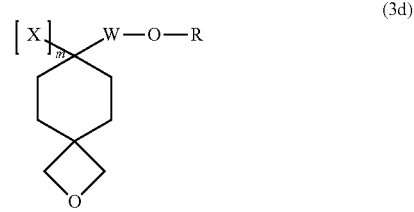
(3d)

wherein "m" denotes 0 or 1; R, W, and X are as defined above, and wherein at least one of W and X in Formula (3b) includes an aromatic or non-aromatic carbocyclic ring.

Typical examples of the oxetane-ring-containing vinyl ether compound (A) for use herein include the following compounds. In the following formulae, "n" denotes an integer of from 0 to 6.

[Chem. 7]

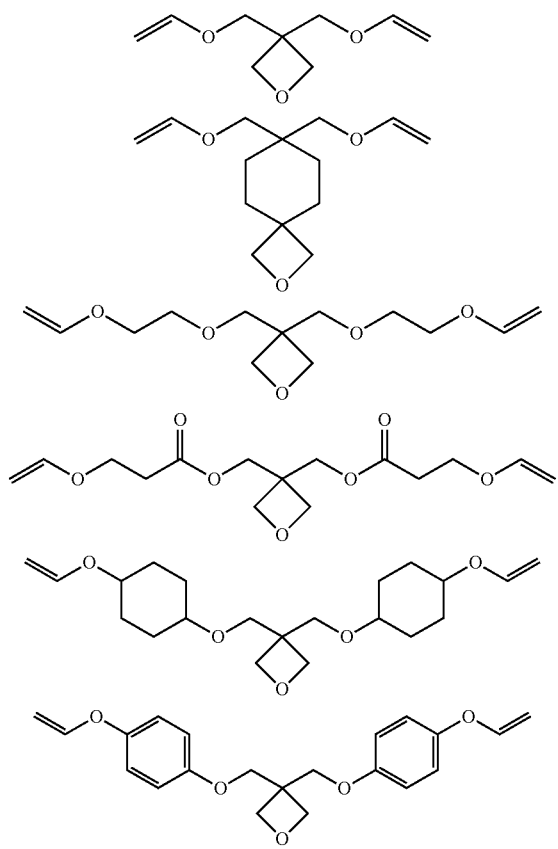

[Chem. 8]

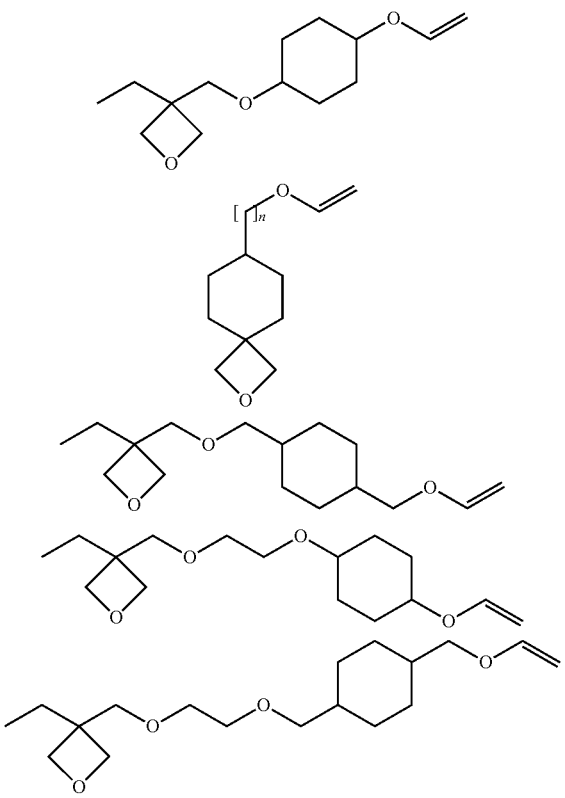

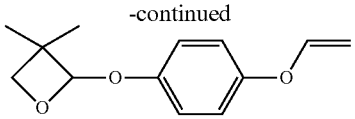

The oxetane-ring-containing vinyl ether compound (A) for use in the present invention may be produced by a reaction known as a production process for vinyl ether compounds. In a preferred embodiment, an oxetane-ring-containing vinyl ether compound (A) is produced by a process of reacting an alcohol (hydroxy compound) corresponding to the oxetane-ring-containing vinyl ether compound (A) with a vinyl ester compound in the presence of a transition element compound. Typically, an oxetane-ring-containing vinyl ether compound (A) represented by Formula (3) may be prepared by reacting a corresponding alcohol (hydroxy compound) of Formula (3), wherein R is a hydrogen atom, with a vinyl ester compound in the presence of a transition element compound.

[Alicyclic-Epoxy-Containing Vinyl Ether Compound (B)]

The vinyl ether compound (B) containing an alicyclic epoxy group (alicyclic-epoxy-containing vinyl ether compound (B)) for use in the present invention is not limited, as long as being a compound having at least an alicyclic epoxy group (group composed of an epoxy ring and an alicyclic ring possessing two carbon atoms in common) and a vinyl ether structure in the molecule. Typical examples of the alicyclic-epoxy-containing vinyl ether compound (B) include compounds each represented by following Formula (6):

[Chem. 9]

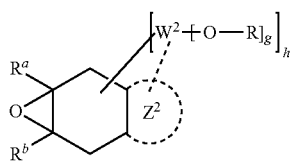

(6)

wherein Ring $Z^2$ represents a non-aromatic carbocyclic ring and may be present or absent in the molecule; R represents a substituted or unsubstituted vinyl group represented by Formula (4); $W^2$ is a linkage group connecting between the substituted or unsubstituted vinyloxy group (—OR group) and the cyclohexane ring or Ring Z and represents a single bond or an organic group having a valency of (g+1); $R^a$ and $R^b$ are the same as or different from each other and each independently represent a hydrogen atom or an alkyl group; "g" and "h" are as defined above and each independently denote 1 or 2, wherein, when "g" and/or "h" is 2, two substituents in the brackets may be the same as or different from each other.

When $R^a$ and $R^b$ are both hydrogen atoms in the compounds, it is preferred that at least Ring $Z^2$ is present, or $W^2$ is a group represented by following Formula (7):

[Chem. 10]

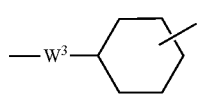

(7)

wherein $W^3$ represents a single bond or a divalent organic group, and wherein a carbon atom constituting the cyclohexane ring is bonded to the —OR group.

The compounds having the above structure are vinyl ether compounds each containing an alicyclic epoxy group (group composed of 1,2-epoxycyclohexane ring, i.e., 7-oxabicyclo[4.1.0]heptane ring) and further having a non-aromatic carbocyclic ring at a specific position in the molecule or having an alkyl group at a junction site between the oxirane ring and the cyclohexane ring constituting the alicyclic epoxy group. Such vinyl ether compounds not only have extremely high curing rates but can give, through curing, cured objects excellent in properties such as optical transparency and thermal stability, thus being significantly advantageous.

In Formula (6), Ring $Z^2$ represents a non-aromatic carbocyclic ring. Ring $Z^2$ may be present or absent in the molecule. Exemplary non-aromatic carbocyclic rings are as with those listed above as the non-aromatic carbocyclic rings in the description of the oxetane-ring-containing vinyl ether compound (A).

In Formula (6), R represents a substituted or unsubstituted vinyl group represented by Formula (4). In Formula (4), $R^4$, $R^5$, and $R^6$ are the same as or different from each other and each independently represent a hydrogen atom or an alkyl group having 1 to 4 carbon atoms. Exemplary alkyl groups having 1 to 4 carbon atoms are as with those listed above as the alkyl groups having 1 to 4 carbon atoms in the description of the oxetane-ring-containing vinyl ether compound (A).

In Formula (6), $W^2$ is a linkage group connecting between the substituted or unsubstituted vinyloxy group (—OR group) and the cyclohexane ring or Ring Z and represents a single bond or an organic group having a valency of (m+1). The organic group is generally a group having a carbon atom at the bonding site to the adjacent oxygen atom. Preferred examples of the organic group include (i) hydrocarbon groups, and (ii) groups each composed of one or more hydrocarbon groups and at least one group selected from the group consisting of oxygen atom (—O—), sulfur atom (—S—), carbonyl group (—CO—), and amino group (—NH—).

The hydrocarbon groups include aliphatic hydrocarbon groups, alicyclic hydrocarbon groups, aromatic hydrocarbon groups, and hydrocarbon groups each composed of two or more of these bonded to each other.

Exemplary hydrocarbon groups are as with those listed in the description of the oxetane-ring-containing vinyl ether compound (A). Such hydrocarbon groups may each have one or more substituents. Examples of the substituents are as with those listed in the description of the oxetane-ring-containing vinyl ether compound (A).

Preferred examples of $W^2$ are as with those listed in the description of the oxetane-ring-containing vinyl ether compound (A). Above all, W is preferably a single bond, or a linear or branched-chain alkylene group having 1 to 6 carbon atoms, or a group composed of the alkylene group and at least one group selected from the group consisting of oxygen atom (—O—), sulfur atom (—S—), and carbonyl group (—CO—) bonded to each other.

The bonding position of $W^2$ to the cyclohexane ring or Ring $Z^2$ is not critical. However, when Ring $Z^2$ is absent, $W^2$ is preferably bonded to the cyclohexane ring at the 4-position and/or 5-position, provided that the junction positions with the oxirane ring be the 1-position and 2-position.

In Formula (6), $R^a$ and $R^b$ are the same as or different from each other and each independently represent a hydrogen atom or an alkyl group. Exemplary alkyl groups include linear or branched-chain alkyl groups having 1 to about 15 carbon atoms, such as methyl, ethyl, propyl, isopropyl, butyl, isobutyl, s-butyl, t-butyl, hexyl, octyl, and decyl groups. Among them, preferred are alkyl groups having 1 to 6 carbon atoms, of which alkyl groups having 1 to 3 carbon atoms (e.g., methyl group) are more preferred.

In Formula (6), "g" is 1 or 2 and is preferably 1; and "h" is 1 or 2. When "g" and/or "h" is 2, two substituents in the brackets may be the same as or different from each other. When $R^a$ and $R^b$ are both hydrogen atoms, it is preferred that at least Ring $Z^2$ is present in the molecule or $W^2$ is a group represented by Formula (7).

In Formula (7), $W^3$ represents a single bond or a divalent organic group. Exemplary divalent organic groups include divalent hydrocarbon groups; and groups each composed of a divalent hydrocarbon group and at least one group selected from oxygen atom (—O—), sulfur atom (—S—), carbonyl group (—CO—), and amino group (—NH—) bonded to each other. Exemplary divalent hydrocarbon groups are those listed above. In particular, $W^3$ is preferably a single bond or an alkyleneoxy group having 1 to 6 carbon atoms (whose oxygen atom being in the rightmost portion).

Of the compounds represented by Formula (6), preferred are compounds represented by following Formula (6a), (6b), or (6c):

[Chem. 11]

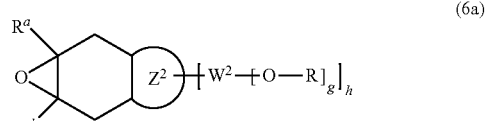

(6a)

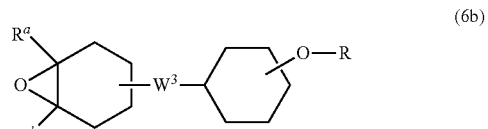

(6b)

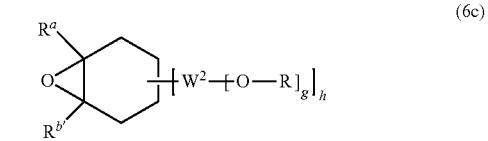

(6c)

wherein $R^{b'}$ represents an alkyl group having 1 to 6 carbon atoms; and Ring $Z^2$, R, $R^a$, $R^b$, $W^2$, $W^3$, "g", and "h" are as defined above, and wherein $W^2$ in Formula (6a) connects between —OR group and Ring $Z^2$.

In Formula (6a), $R^a$ and $R^b$ are each preferably a hydrogen atom or an alkyl group having 1 to 6 carbon atoms and are each more preferably a hydrogen atom or an alkyl group having 1 to 3 carbon atoms (e.g., methyl group). It is also preferred that at least one of $R^a$ and $R^b$ is a hydrogen atom. Ring $Z^2$ is particularly preferably a cycloalkane ring having about 5 to about 12 members, such as cyclopentane ring, cyclohexane ring, or cyclooctane ring; or a bridged alicyclic ring having about 8 to about 15 carbon atoms, such as decalin ring or norbornane ring. $W^2$ is preferably a single bond; a hydrocarbon group having 1 to 15 carbon atoms; or a group composed of one or more hydrocarbon groups having 1 to 15 carbon atoms and at least one group selected from oxygen atom (—O—), sulfur atom (—S—), carbonyl group (—CO—), and amino group (—NH—) bonded to each other.

In Formula (6b), $R^a$ and $R^b$ are each preferably a hydrogen atom or an alkyl group having 1 to 6 carbon atoms and each more preferably a hydrogen atom or an alkyl group having 1 to 3 carbon atoms (e.g., methyl group). It is also preferred that at least one of $R^a$ and $R^b$ is a hydrogen atom. $W^3$ is particularly preferably a single bond or an alkyleneoxy group having 1 to 6 carbon atoms (whose oxygen atom being in the rightmost portion).

In Formula (6c), $R^a$ is preferably a hydrogen atom or an alkyl group having 1 to 6 carbon atoms, more preferably a hydrogen atom or an alkyl group having 1 to 3 carbon atoms, and particularly preferably a hydrogen atom. $R^{b'}$ is preferably an alkyl group having 1 to 3 carbon atoms, and particularly preferably a methyl group. $W^2$ is particularly preferably a single bond; a hydrocarbon group having 1 to 15 carbon atoms; or a group composed of one or more hydrocarbon groups having 1 to 15 carbon atoms and at least one group selected from oxygen atom (—O—), sulfur atom (—S—), carbonyl group (—CO—), and amino group (—NH—) bonded to each other.

Typical examples of the alicyclic-epoxy-containing vinyl ether compound (B) for use herein include the following compounds. In the following formulae, "p" and "q" are each 0 or 1; and $A^3$ represents a linear or branched-chain alkylene group having 2 to 10 carbon atoms (preferably 2 to 6 carbon atoms).

[Chem. 12]

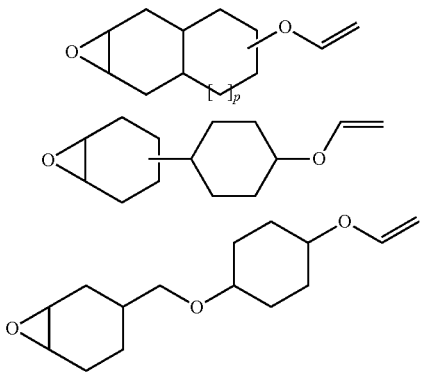

[Chem. 13]

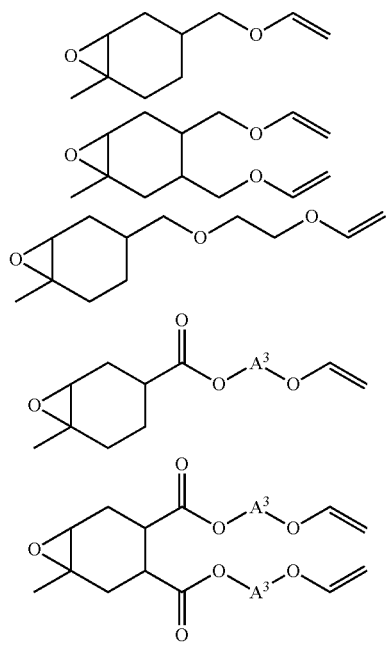

-continued

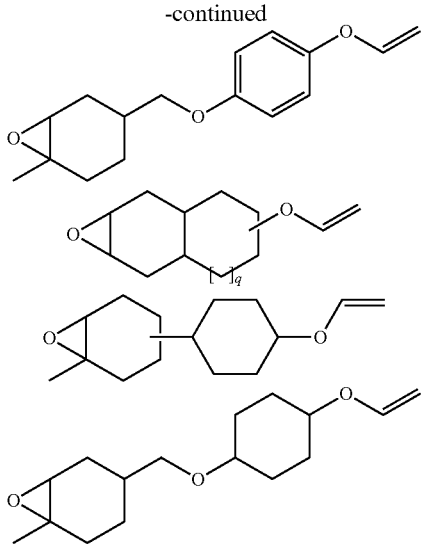

The alicyclic-epoxy-containing vinyl ether compound (B) for use in the present invention may be produced through a reaction known as a production process for vinyl ether compounds. In a preferred embodiment, an alicyclic-epoxy-containing vinyl ether compound (B) is produced by a process of reacting an alcohol (hydroxy compound), corresponding to the alicyclic-epoxy-containing vinyl ether compound (B) with a vinyl ester compound in the presence of a transition element compound. Specifically, an alicyclic-epoxy-containing vinyl ether compound (B) represented by Formula (6) may be prepared by reacting a corresponding alcohol (hydroxy compound) of Formula (6), wherein R is a hydrogen atom, with a vinyl ester compound in the presence of a transition element compound. The alcohol (hydroxy compound) corresponding to the alicyclic-epoxy-containing vinyl ether compound (B) may be synthetically prepared from a known compound using a known reaction.

[Oligomer or Polymer (C)]

The oligomer or polymer (C) for use in the present invention is an oligomer or polymer containing at least one of structures (constitutional repeating units) represented by Formulae (1a) to (1f), being liquid at 0° C., and having a molecular weight of 500 or more. Specifically, the molecular weight is from 500 to about 1,000,000, and is preferably from 3000 to 500,000.

In Formulae (1a) to (1f), $R^x$ represents a hydrogen atom or a methyl group; $R^1$, $R^2$, and $R^3$ each independently represent a hydrocarbon group having 1 to 5 carbon atoms; "a" is an integer of from 0 to 5; and "b" is 1 or 2.

Exemplary hydrocarbon groups having 1 to 5 carbon atoms as $R^1$, $R^2$, and $R^3$ include alkyl groups having 1 to 5 carbon atoms, such as methyl, ethyl, propyl, isopropyl, butyl, isobutyl, s-butyl, t-butyl, and pentyl groups; alkenyl groups having 2 to 5 carbon atoms, such as vinyl, allyl, and 1-butenyl groups; alkynyl groups having 2 to 5 carbon atoms, such as ethynyl and propynyl groups; and cycloalkyl groups having 3 to 5 members, such as cyclopropyl, cyclobutyl, and cyclopentyl groups. The hydrocarbon groups having 1 to 5 carbon atoms may each be substituted with one or more substituents.

The oligomer or polymer (C), as having at least one of the structures represented by Formulae (1a) to (1f), is capable of undergoing a cationic polymerization with the compound (A) and/or (B) and helps the resin composition to give a highly thermally stable cured object. The oligomer or polymer (C), as being liquid at 0° C., helps the resin composition to have satisfactory handleability and to give a cured object which excels in flexibility and post-heat-treatment bendability. The oligomer or polymer (C), as having a molecular weight of 500 or more, helps the resin composition to give a cured object which has further satisfactory flexibility. The oligomer or polymer (C), if having a molecular weight of less than 500, may not so satisfactorily help the cationically polymerizable resin composition to give, through curing, a cured object with satisfactory flexibility.

The oligomer or polymer (C) may further contain a structure (constitutional repeating unit) represented by Formula (2), in addition to at least one of the structures represented by Formulae (1a) to (1f). The oligomer or polymer (C), when further containing the structure represented by Formula (2), may often help the resin composition to give a cured object having higher flexibility and more satisfactory post-heat-treatment bendability. The structure represented by Formula (2) may be introduced into the oligomer or polymer (C) by copolymerizing a monomer corresponding to the structure with a monomer or monomers corresponding to the at least one of the structures (constitutional repeating units) represented by Formulae (1a) to (1f).

In Formula (2), $R^x$ represents a hydrogen atom or a methyl group; and $R^4$ represents a substituted or unsubstituted hydrocarbon group having 4 or more carbon atoms. Examples of the hydrocarbon group having 4 or more carbon atoms as $R^4$ include aliphatic hydrocarbon groups, alicyclic hydrocarbon groups, aromatic hydrocarbon groups, and groups each composed of two or more of these bonded to each other.

Exemplary aliphatic hydrocarbon groups include alkyl groups having 4 to 20 carbon atoms, such as butyl, isobutyl, s-butyl, t-butyl, pentyl, hexyl, heptyl, octyl, isooctyl, 2-ethylhexyl, decyl, dodecyl, and tetradecyl groups, of which those having 4 to 12 carbon atoms are preferred; alkenyl groups having 4 to 20 carbon atoms, such as 1-butenyl, 2-butenyl, and 1-hexenyl groups, of which those having 4 to 12 carbon atoms are preferred; and alkynyl groups having 4 to 20 carbon atoms, such as butynyl group, of which those having 4 to 12 carbon atoms are preferred. Exemplary alicyclic hydrocarbon groups include cycloalkyl groups having about 4 to about 20 members, such as cyclopentyl, cyclohexyl, and cyclooctyl groups, of which those having about 4 to about 15 members are preferred, and those having about 5 to about 8 members are more preferred; cycloalkenyl groups having about 4 to about 20 members, such as cyclopentenyl and cyclohexenyl groups, of which those having about 4 to about 15 members are preferred, and those having about 5 to about 8 members are more preferred; and bridged hydrocarbon groups such as perhydronaphth-1-yl group, norbornyl, adamantyl, and tetracyclo[$4.4.0.1^{2,5}.1^{7,10}$]dodec-3-yl groups. Examples as the aromatic hydrocarbon groups include aromatic hydrocarbon groups having about 6 to about 14 carbon atoms, such as phenyl and naphthyl groups, of which those having about 6 to about 10 carbon atoms are preferred. Exemplary groups each composed of an aliphatic hydrocarbon group and an alicyclic hydrocarbon group bonded to each other include cycloalkyl-alkyl groups (e.g., cycloalkyl-alkyl groups whose cycloalkyl moiety having 3 to 20 carbon atoms and whose alkyl moiety having 1 to 4 carbon atoms), such as cyclopentylmethyl, cyclohexylmethyl, and 2-cyclohexylethyl groups. Exemplary hydrocarbon groups each composed of an aliphatic hydrocarbon group and an aromatic hydrocarbon group bonded to each other include aralkyl groups (e.g., aralkyl groups having 7 to 18 carbon atoms) such as benzyl group; and tolyl group and other alkyl-substituted aryl groups, such as phenyl group or naphthyl group substituted with one to about four alkyl groups having 1 to 4 carbon atoms. Of these, particularly preferred examples are alkyl groups having 4 to 20 carbon atoms, of which those having 4 to 12 carbon atoms are preferred; alicyclic hydrocarbon groups having 4 to 20 members, of which those having 4 to 15 members are preferred; the cycloalkyl-alkyl groups; and the aralkyl groups.

[Compound (D) Containing Only One Functional Group Selected from Epoxy Group and Oxetanyl Group but Having Neither Vinyl Ether Group Nor Vinyl Polymer Chain in Molecule]

The cationically polymerizable resin composition according to the present invention, when further containing a compound (D) having only one functional group selected from epoxy group and oxetanyl group but having neither vinyl ether group nor vinyl polymer chain in the molecule, may have significantly improved post-heat-treatment bendability (flexibility) without deterioration in other properties.

Examples of the compound (D) include oxetane compounds each represented by following Formula (8):

[Chem. 14]

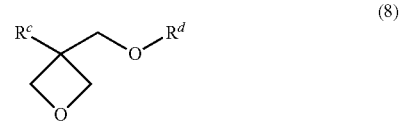

wherein $R^c$ represents a hydrocarbon group; and $R^d$ represents a hydrocarbon group other than vinyl group.

Exemplary hydrocarbon groups as $R^c$ and $R^d$ include aliphatic hydrocarbon groups, alicyclic hydrocarbon groups, aromatic hydrocarbon groups, and groups each composed of two or more of these bonded to each other.

Exemplary aliphatic hydrocarbon groups include alkyl groups having 1 to 20 carbon atoms, such as methyl, ethyl, propyl, isopropyl, butyl, isobutyl, s-butyl, t-butyl, pentyl, hexyl, heptyl, octyl, isooctyl, 2-ethylhexyl, decyl, dodecyl, and tetradecyl groups, of which those having 1 to 12 carbon atoms are preferred; alkenyl groups having 2 to 20 carbon atoms, such as vinyl, allyl, 1-butenyl, 2-butenyl, and 1-hexenyl groups, of which those having 2 to 12 carbon atoms are preferred; and alkynyl groups having 2 to 20 carbon atoms, such as ethynyl and propynyl groups, of which those having 2 to 12 carbon atoms are preferred. Exemplary alicyclic hydrocarbon groups include cycloalkyl groups having 3 to about 20 members, such as cyclopentyl, cyclohexyl, and cyclooctyl groups, of which those having 3 to about 15 members are preferred, and those having about 5 to about 8 members are more preferred; cycloalkenyl groups having 3 to about 20 members, such as cyclopentenyl and cyclohexenyl groups, of which those having 3 to about 15 members are preferred, and those having about 5 to about 8 members are more preferred; and bridged hydrocarbon groups such as perhydronaphth-1-yl group, norbornyl, adamantyl, and tetracyclo-[$4.4.0.1^{2,5}.1^{7,10}$]dodec-3-yl groups. Exemplary aromatic hydrocarbon groups include aromatic hydrocarbon groups having about 6 to about 14 carbon atoms, such as phenyl and naphthyl groups, of which those having about 6 to about 10 carbon atoms are preferred. Examples of groups each composed of an aliphatic hydrocarbon group and an alicyclic hydrocarbon group bonded to each other include cycloalkyl-alkyl groups (e.g., cycloalkyl-alkyl groups whose cycloalkyl moiety having 3 to 20 carbon atoms and whose alkyl moiety having 1 to 4 carbon atoms), such as cyclopentylmethyl, cyclohexylmethyl, and 2-cyclohexylethyl groups. Exemplary hydrocarbon groups each composed of an aliphatic hydrocarbon group and an aromatic hydrocarbon group bonded to each other include aralkyl groups (e.g., aralkyl groups having 7 to 18 carbon atoms), such as benzyl group; and tolyl group and other alkyl-substituted aryl groups, such as phenyl group or naphthyl group substituted with one to about four alkyl groups having 1 to 4 carbon atoms. Among them, particularly preferred are alkyl groups having 1 to 20 carbon atoms, of which those having 1 to 12 carbon atoms are preferred; alicyclic hydrocarbon groups having 3 to 20 members, of which those having 3 to 15 members are more preferred; and groups each composed of these bonded to each other.

The hydrocarbon groups may each have one or more halogen atoms as substituents.

Specific examples of the oxetane compounds include 3-ethyl-3-(2-ethylhexyloxymethyl)oxetane represented by following Formula (8a), and 3-ethyl-3-(cyclohexyloxymethyl)oxetane represented by following Formula (8b):

[Chem. 15]

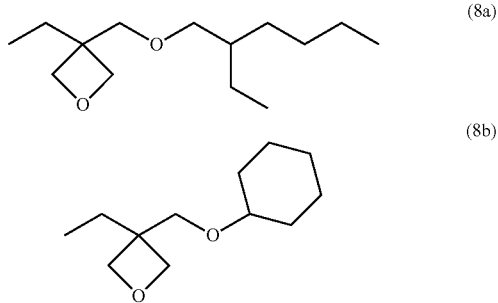

(8a)

(8b)

[Cationically Polymerizable Resin Composition]

The cationically polymerizable resin composition according to the present invention includes at least an oxetane-ring-containing vinyl ether compound (A) and/or an alicyclic-epoxy-containing vinyl ether compound (B); and an oligomer or polymer (C) which contains at least one of the structures represented by Formulae (1a) to (1f), is liquid at 0° C., and has a molecular weight of 500 or more.

The cationically polymerizable resin composition according to the present invention contains the oxetane-ring-containing vinyl ether compound (A) and/or the alicyclic-epoxy-containing vinyl ether compound (B) in a content (total content) of preferably from 6 to 85 percent by weight (e.g., from 6 to 80 percent by weight), and more preferably from 10 to 60 percent by weight (e.g., from 10 to 50 percent by weight), based on the total weight of the cationically polymerizable resin composition. The cationically polymerizable resin composition, if containing the oxetane-ring-containing vinyl ether compound (A) and/or the alicyclic-epoxy-containing vinyl ether compound (B) in a content (total content) of less than 6 percent by weight, may often have a significantly low curing rate, thus being unpractical. In contrast, the cationically polymerizable resin composition, if containing one or both of the two components in a total content of more than 85 percent by weight, may often give a cured object having insufficient flexibility. The cationically polymerizable resin composition, as using the oxetane-ring-containing vinyl ether compound (A) and/or the alicyclic-epoxy-containing vinyl ether compound (B), can give a cured object which has both satisfactory curability and sufficient flexibility. The cationically polymerizable resin composition is therefore extremely advantageous as a material in fields where satisfactory thermal stability, optical transparency, flexibility, and curability are required, and is particularly advantageous as a material for optical fields typically of optical waveguides. The thermal stability in the present invention is evaluated by weight loss upon heating.

The cationically polymerizable resin composition according to the present invention contains the oligomer or polymer (C) in a content of preferably from 5 to 94 percent by weight (e.g., from 5 to 92 percent by weight), and more preferably from 30 to 90 percent by weight (e.g., from 30 to 88 percent by weight), based on the total weight of the cationically polymerizable resin composition. The cationically polymerizable resin composition, if containing the oligomer or polymer (C) in a content of less than 5 percent by weight, may often give a cured object having insufficient flexibility through curing, and this may impede the use of the resulting cured object typically as a flexible optical waveguide. In contrast, the cationically polymerizable resin composition, if containing the oligomer or polymer (C) in a content of more than 94 percent by weight, may have an excessively high viscosity and may thereby be difficult to use.

The cationically polymerizable resin composition according to the present invention contains the compound (D) in a content of preferably from 0 to 85 percent by weight (e.g., from 4 to 85 percent by weight), and more preferably from 0 to 50 percent by weight (e.g., from 10 to 50 percent by weight), based on the total weight of the cationically polymerizable resin composition. The compound (D), if contained in a content of less than 4 percent by weight, may be difficult to exhibit sufficient effects to improve the post-heat-treatment bendability (flexibility) of the cured object. In contrast, the compound (D), if contained in a content of more than 85 percent by weight, may cause the cationically polymerizable resin composition to have an excessively low curing rate and to give a cured object being fragile.

The cationically polymerizable resin composition according to the present invention may further contain one or more other additives according to necessity. Typically, the cationically polymerizable resin composition may further contain one or more polymerization initiators. The polymerization initiators are not limited, as long as being photo-induced cationic polymerization initiators and other initiators capable of inducing ionic (cationic) polymerization; and any of known polymerization initiators and light-activatable acid generators, for example, may be used.

The photo-induced cationic polymerization initiators are preferably composed of a cationic moiety and an anionic moiety, in which the anionic moiety has a charge density equal to or higher than that of $PF_6^-$. This is because such photo-induced cationic polymerization initiators have extremely good solubility, exhibit excellent cationic curability to improve the curing rate significantly, and give cured objects with very excellent optical transparency, thus being effective. A photo-induced cationic polymerization initiator, if being composed of an anionic moiety having a charge density lower than that of $PF_6^-$, may show insufficient coloring resistance, thus being unsuitable in applications where optical transparency is required, though the photo-induced cationic polymerization initiator exhibits improved reactivity and solubility. As used herein the term "charge density" is used in the meaning defined by J. V. Crivello and J. H. W. Lam in Macromolecules, 1307, Vol. 10, 1997. The anionic moiety "having a charge density equal to or higher than that of $PF_6^-$" may be any of anions containing at least one fluorine atom and having high nucleophilicity, such as $PF_6^-$, $BF_4^-$, and $CF_3SO_4^-$.

Exemplary photo-induced polymerization initiators usable in the present invention include sulfonium salts such as triallylsulfonium hexafluorophosphate and triarylsulfonium hexafluoroantimonates; iodonium salts such as diaryliodonium hexafluorophosphates, diphenyliodonium hexafluoroantimonate, bis(dodecylphenyl)iodonium tetrakis(pentafluorophenyl)borate, and iodonium[4-(4-methylphenyl-2-methylpropyl)phenyl]hexafluorophosphate; phosphonium salts such as tetrafluorophosphonium hexafluorophosphate; and Pyridium salts. The oxetane-ring-containing vinyl ether compound (A) and/or alicyclic-epoxy-containing vinyl ether compound (B) for use in the present invention readily dissolve such polymerization initiators therein, thereby the polymerizable composition is easily prepared.

Such photo-induced cationic polymerization initiators may be commercially available as products typically under the trade names "Irgacure 250" from Ciba Japan and "Uvacure 1591" from Daicel-Cytec Co., Ltd.

The cationically polymerizable resin composition may contain polymerization initiators in an amount of generally from about 0.01 to about 50 percent by weight, and preferably from about 0.1 to about 20 percent by weight. The cationically polymerizable resin composition, when containing polymerization initiators within the above-specified range, may be excellent in balance between polymerization rate and storage stability.

Where necessary, the cationically polymerizable resin composition according to the present invention may further contain one or more curable compounds (e.g., epoxy compounds, oxetane compounds, and vinyl ether compounds), in addition to the oxetane-ring-containing vinyl ether compound (A) and/or the alicyclic-epoxy-containing vinyl ether compound (B), the oligomer or polymer (C), and the compound (D). Typically, the cationically polymerizable resin composition may further contain a product under the trade name "CELLOXIDE 2021P" (supplied by Daicel Corporation). The product under the trade name "CELLOXIDE 2021P" (supplied by Daicel Corporation) may easily form a bonding with an adherend and, when used typically in an amount of from 1 to 30 percent by weight, helps the cationically polymerizable resin composition to give a cured object with further higher adhesion to the adherend.

The cationically polymerizable resin composition may also further contain one or more known additives according to necessity. Exemplary additives herein include setting-expandable monomers, photosensitizers (e.g., anthracene sensitizers), resins, adhesion promoters, reinforcers, softeners, plasticizers, viscosity modifiers, solvents, inorganic or organic particles (e.g., nano-scale particles), and fluorosilanes.

The setting-expandable monomers, when added, help the cationically polymerizable resin composition to show a reduced cure shrinkage and are thereby expected to contribute typically to a lower residual stress and higher adhesion effectively. Exemplary setting-expandable monomers include bi(3,4-epoxy)cyclohexyl compounds (compounds having an epoxy-containing cyclohexane ring bonded through a single bond) and carbonate compounds (e.g., spiroorthocarbonates and dithiocarbonates).

The photosensitizers help the photo-induced cationic polymerization initiators to exhibit further satisfactory activities and thereby promote the photo-induced cationic polymerization of the cationically polymerizable resin composition. Examples of such photosensitizers usable herein include, but are not limited to, carbonyl compounds, organic sulfur compounds, persulfides, redox compounds, azo compounds, diazo compounds, halogen compounds, and photoreductive dyes. Specific examples of photosensitizers include benzoin derivatives such as benzoin methyl ether and benzoin isopropyl ether; benzophenone derivatives such as benzophenone, 2,4-dichlorobenzophenone, methyl o-benzoylbenzoate, and 4,4'-bis(dimethylamino)benzophenone; thioxanthone derivatives such as 2-chlorothioxanthone and 2-isopropylthioxanthone; anthraquinone derivatives such as 2-chloroanthraquinone and 2-methylanthraquinone; and anthracene derivatives such as dipropoxyanthracene and dibutoxyanthracene. Each of different photosensitizers may be used alone or in combination.

The cationically polymerizable resin composition according to the present invention may be produced by stirring and blending the oxetane-ring-containing vinyl ether compound (A) and/or the alicyclic-epoxy-containing vinyl ether compound (B), the oligomer or polymer (C), and according to necessity, the compound (D), other compounds, and additives with each other using a customarily known apparatus. The production of the cationically polymerizable resin composition according to the present invention is preferably performed while blocking ultraviolet rays; and the resulting cationically polymerizable resin composition is preferably placed in a light-shielding container and stored in a cool and dark place.

The cationically polymerizable resin composition according to the present invention includes the oxetane-ring-containing vinyl ether compound (A) and/or the alicyclic-epoxy-containing vinyl ether compound (B), the oligomer or polymer (C), and, according to necessity, the compound (D), thereby characteristically has a low viscosity, is easy to work, and has an extremely high curing rate. In addition, the cationically polymerizable resin composition significantly advantageously gives, through curing, a cured object which excels in optical transparency, thermal stability, flexibility, and post-heat-treatment bendability (flexibility). For these reasons, the cationically polymerizable resin composition according to the present invention is usable in a wide variety of fields including paints, coating materials, ink-jet inks and other inks, adhesives, resists, plate-making materials, molding materials, color filters, flexible substrates, and sealing materials; as well as optical fields typically of waveguides (e.g., optical waveguides and hybrid boards) and optical fibers. Above all, the cationically polymerizable resin composition is very useful for optical uses such as flexible optical waveguides. The cationically polymerizable resin composition is also preferably usable as a resin composition for use in optically transparent sealants and nanoimprinting technologies.

[Cured Object]

The cured object according to the present invention can be obtained by irradiating the cationically polymerizable resin composition according to the present invention with light to thereby polymerize the composition. Typically, the cured object can be produced by forming a desired image or shape using the cationically polymerizable resin composition according to the present invention by a customary process such as ink-jet process or lithography process, followed by exposing.

The exposure may be performed using an irradiation source such as a mercury lamp, a xenon lamp, a carbon arc lamp, a metal halide lamp, sun-light, electron beams, or laser beams. The curing may be controlled by suitably setting conditions such as intensity of light to be applied, temperature, and irradiation time; and/or by selecting the components (e.g., addition of curing control agents) of the cationically polymerizable resin composition. Above all, the curing is preferably controlled by means of temperature control during exposure and after exposure (postbaking).

After the exposure, the cationically polymerizable resin composition according to the present invention may be subjected to a heat treatment at a temperature typically of from about 50° C. to about 180° C. to promote the curing. Such a heat treatment after exposure (postbaking) is effective for curing of a thick film or curing of unexposed portions, or curing of a cationically polymerizable resin composition containing, for example, a filler or a pigment.

The cured object according to the present invention excels typically in optical transparency, thermal stability, flexibility, and post-heat-treatment bendability (flexibility). Accordingly, the cationically polymerizable resin composition is very useful in the fields typically of waveguides (e.g., optical waveguides and photoelectric hybrid circuit boards), optical fibers, base films and protective films for solar cells, base films and protective films for flexible displays, base films and protective films for organic EL devices, optically transparent sealants, adhesives, ink-jet inks, color filters, nanoimprinting, and flexible boards. Above all, the composition is extremely useful in the fields of flexible optical waveguides, optical fibers, optically transparent sealants, and nanoimprinting.

The optical transparency in the present invention may be evaluated by transmittance of light at a wavelength of from 400 to 850 nm. The present invention may give a cured object having the transmittance of typically 70% or more, preferably 80% or more, and particularly preferably 85% or more and having satisfactory optical transparency.

The flexibility in the present invention may be evaluated by bendability. Typically, the bendability may be determined by placing a film-shaped cured object having a thickness of 200 μm around a rod having a radius of 2 mm, and observing whether or not cracks (cracking) occur. The present invention may give a cured object which has such satisfactory flexibility as to bend without cracks (cracking).

The term "thermal stability" as used herein means that a cured object obtained from a cationically polymerizable resin composition through light irradiation maintains its weight even when subjected to a heat treatment. A cured object obtained from the cationically polymerizable resin compositions according to the present invention has satisfactory thermal stability and is very useful in fields where the cured object after curing is exposed to heat.

The post-heat-treatment bendability (flexibility) in the present invention may be evaluated by the procedure for the evaluation of flexibility as above, except that a sample cured object is subjected to a heat treatment before evaluation.

[Optical Waveguide]

An optical waveguide is an optical circuit composed of a core having a high refractive index and a clad having a low refractive index. The cationically polymerizable resin composition according to the present invention has a low viscosity, is easy to work, has an extremely high curing rate, and gives a cured object with high productivity. In addition, the resulting cured object is flexible and has such thermal stability as to endure soldering or another working. Furthermore, the cured object obtained from the cationically polymerizable resin composition according to the present invention maintains satisfactory optical transparency not only immediately after curing but also after heating and exhibits such excellent optical properties as to significantly suppress optical loss. For these reasons, the cationically polymerizable resin composition according to the present invention is very useful as a material for constituting the clad and core of an optical waveguide. For example, when the cationically polymerizable resin composition according to the present invention is used as a material for the formation of the clad, a material for the formation of the core may be a material containing the cationically polymerizable resin composition and further containing a material having a high refractive index (e.g., 1-acryloxy-4-methoxynaphthalene). Vice versa, when the cationically polymerizable resin composition according to the present invention is used as a material for the formation of the core, a material for the formation of the clad may be a material containing the cationically polymerizable resin composition and further containing a material having a low refractive index.

The optical waveguide according to the present invention may be produced typically by applying the cationically polymerizable resin composition according to the present invention to a film to form a clad base film; and covering a core with the clad base film.

More specifically but illustratively, the optical waveguide may be produced typically by a reactive ion etching (RIE) process of applying the cationically polymerizable resin composition according to the present invention to a substrate (film) to form a clad layer, laying a core layer on the clad layer, further applying a resist to form a resist film thereon, exposing the resist film through a mask, followed by developing, etching, and removing the resist to form a core, and forming an upper clad layer so as to cover the core.

The cationically polymerizable resin composition, when used for an optical waveguide, may further contain, for example, a metal oxide of nanometer size, in order to regulate the refractive index. Exemplary metal oxides include zirconium oxide and titanium oxide, and such metal oxides may have a size of typically from about 1 to about 100 nm. Independently, the cationically polymerizable resin composition preferably further contains one or more setting-expandable compounds such as bicyclohexene oxide and/or 2,2-dimethylpropyl carbonate, for the purpose of suppressing cure shrinkage.

Suitability as an optical waveguide may be determined through known evaluations for waveguide properties. Though not limited, such waveguide properties may be evaluated typically by a method of measuring an optical loss according to a known procedure on a simplified waveguide composed of a cured object obtained from the cationically polymerizable resin composition. A cured object obtained from the cationically polymerizable resin composition according to the present invention has an optical loss of 0.3 dB/cm or less, and preferably 0.2 dB/cm or less, as determined by a cutback technique at a wavelength of 850 nm and has satisfactory optical waveguide properties. Such an optical waveguide formed using the cured object obtained from the cationically polymerizable resin composition according to the present invention has good thermal stability and is significantly resistant to increase in optical loss even after heating.

The optical waveguide according to the present invention is formed from the cationically polymerizable resin composition according to the present invention, thereby has satisfactory flexibility, is capable of bending freely, and, even when it is bent, does not suffer from cracks (cracking) and from increase in optical loss. The optical waveguide is therefore usable as being suitably deformed according to the shape of a position where the optical waveguide is arranged. The optical waveguide has high thermal stability, can thereby endure soldering or another working, is resistant to increase in optical loss even after heating, and is thereby usable even in a high-temperature environment. In addition, the optical waveguide has high optical transparency and does not suffer from deterioration in optical transparency even after heating.

The optical waveguide according to the present invention may be used as a simple optical circuit board or may be hybridized with an electric wiring. In the latter case, the optical waveguide may be used as optical interconnections for photoelectric hybrid wirings (interconnections).

[Photoelectric Hybrid Circuit Board]

A photoelectric hybrid circuit board according to the present invention includes the optical waveguide and, provided thereon, an electric wiring. The optical waveguide according to the present invention has high thermal stability and, when hybridized with an electric wiring to form a printed circuit board, can be handled as a customary printed circuit board including an electric wiring is. In addition, the optical waveguide according to the present invention has high flexibility and can be hybridized with a flexible printed circuit board (FPC).

The electric wiring may be formed typically through plating, printing, or etching. The plating (e.g., nickel, copper, or silver plating) may be conducted according to a known procedure such as electroless plating or electrolytic plating. The printing may be conducted generally typically by performing screen-process printing or ink-jet printing with an electroconductive ink including electroconductive particles. Exemplary electroconductive particles include electroconductive inorganic particles such as particles of silver, gold, copper, nickel, ITO, and carbon, as well as carbon nanotubes; and electroconductive organic polymer particles such as particles of polyanilines, polythiophenes, polyacetylenes, and polypyrroles. The etching may be conducted typically by affixing a copper foil to the surface of the substrate and removing unnecessary portions of the copper foil through etching.

In an embodiment of the photoelectric hybrid circuit board according to the present invention, an electric wiring may be provided on the optical waveguide with the interposition of a porous layer. The photoelectric hybrid circuit board according to this embodiment may have a further finer wiring (further finer interconnections).

The porous layer formed on the optical waveguide has a thickness of typically from 0.1 to 100 µm, preferably from 0.5 to 70 µm, and more preferably from 1 to 50 µm. The porous layer preferably includes a multiplicity of continuous micropores with an average pore size (i.e., average size of micropores inside the film) of preferably from 0.01 to 10 µm, and more preferably from 0.05 to 5 µm. The micropores, if having an average pore size out of the above-specified range, may be difficult to exhibit desired effects according to the intended use and thereby be inferior in pore properties. Typically, the micropores, if having an excessively small size, may cause the porous layer to have insufficient cushioning property and to show insufficient ink permeability. In contrast, the micropores, if having an excessively large size, may cause the ink to diffuse excessively or may impede the formation of a fine wiring.

The porous layer has an average rate of inner pore area (porosity) of typically from 30% to 80%, preferably from 40% to 80%, and more preferably from 45% to 80%. The porous layer, if having a porosity out of the above range, may be difficult to exhibit desired pore properties according to the intended use. Typically, the porous layer, if having an excessively low porosity, may have insufficient cushioning properties or may impede ink penetration; and the porous layer, if having an excessively high porosity, may show poor strength or poor folding endurance. The porous layer has a rate of surface pore area of typically about 48% or more (e.g., from about 48% to about 80%) and preferably from about 60% to about 80%. The porous layer, if having an excessively low rate of surface pore area, may not show sufficient permeation capability; and the porous layer, if having an excessively high rate of surface pore area, may often show insufficient strength and poor folding endurance. The porous layer may have been treated so as to have chemical resistance. In addition or alternatively, the porous layer may be covered with a chemically-resistant polymer.

Exemplary polymer components as materials for constituting the porous layer include plastics such as polyimide resins, polyamideimide resins, poly(ether sulfone) resins, poly(ether imide) resins, polycarbonate resins, poly(phenylene sulfide) resins, liquid crystalline polyester resins, aromatic polyamide resins, polyamide resins, polybenzoxazole resins, polybenzimidazole resins, polybenzothiazole resins, polysulfone resins, cellulose resins, and acrylic resins. Each of different polymer components may be used alone or in combination. In addition or alternatively, copolymers (e.g., graft polymers, block copolymers, and random copolymers) corresponding to the above resins may also be used alone or in combination. Polymerized products each containing the skeleton (polymer chain) of any of the resins in a principal chain or side chain may also be used herein. Specific examples of such polymerized products include polysiloxane-containing polyimides each containing skeletons of polysiloxane and polyimide in a principal chain. Among them, preferred examples of polymer components for constituting the porous layer are polymer components each mainly containing a polyamideimide resin or polyimide resin which has satisfactory thermal stability and excels in mechanical strength, chemical resistance, and electric properties.

The photoelectric hybrid circuit board may for example be obtained by casting a polymer solution into a film on a surface of the optical waveguide (the optical waveguide is hereinafter also simply referred to as "substrate"); introducing the work into a coagulation liquid; subsequently drying the work to form a porous layer on at least one side of the substrate to thereby give a porous film assembly; and forming an electric wiring on the surface of the porous layer of the porous film assembly.

The polymer solution to be cast may for example be a mixed solution containing the polymer component (or a precursor thereof) working as a material for constituting the porous layer; a water-soluble polymer; a water-soluble polar solvent; and, where necessary, water.

The presence of such water-soluble polymer and/or water in the polymer solution to be cast is effective for the film structure to be spongy and porous. Exemplary water-soluble polymers include polyethylene glycols, polyvinylpyrrolidones, poly(ethylene oxide)s, poly(vinyl alcohols, poly (acrylic acid)s, polysaccharides and derivatives thereof, and mixtures of them. Of these, polyvinylpyrrolidones are preferred for suppressing void formation in the film and for improving mechanical strengths of the film. Each of different water-soluble polymers may be used alone or in combination. For allowing the film to be porous satisfactorily, the water-soluble polymer has a molecular weight of preferably 200 or more, more preferably 300 or more, and particularly preferably 400 or more (e.g., from about 400 to about 200,000). The water-soluble polymer may have a molecular weight of 1000 or more. The presence of water may allow the control of the void size. Typically, the polymer solution, when containing water in a larger amount, may give voids with larger sizes.

Exemplary water-soluble polar solvents include dimethyl sulfoxide, N,N-dimethylformamide, N,N-dimethylacetamide (DMAc), N-methyl-2-pyrrolidone (NMP), 2-pyrrolidone, and mixtures of them. Of such solvents, those having a solubility corresponding to the chemical skeleton of the resin used as the polymer component (i.e., good solvent for the polymer component) may be used herein.

Preferred examples as the polymer solution to be cast include a mixed solution containing 8 to 25 percent by weight of a polymer component working as a material constituting the porous film, 5 to 50 percent by weight of a water-soluble polymer, 0 to 10 percent by weight of water, and 30 to 82 percent by weight of a water-soluble polar solvent. The polymer component, if contained in an excessively low concentration, may cause the porous layer to have an excessively small thickness or may often impair desired pore properties of the porous layer. In contrast, the polymer component, if contained in an excessively high concentration, may often cause the porous layer to have a lower porosity. The water-soluble polymer is added so as to allow the porous film (porous layer) to have a uniform spongy porous structure inside thereof. The water-soluble polymer, if contained in an excessively low concentration, may cause the formation of huge voids typically of more than 10 µm in size inside of the film, thus resulting in poor uniformity of the film. In contrast, the water-soluble polymer, if contained in an excessively high concentration, may show poor solubility; and, if contained in a concentration of more than 50 percent by weight, may often cause problems such as weak film strength. The void size may be controlled by the amount of water. Typically, water, when used in a larger amount, may allow voids to have larger sizes.

Upon casting of the polymer solution into a film, the cast film is preferably maintained in an atmosphere at a temperature of from 15° C. to 100° C. and relative humidity of from 70% to 100% for 0.2 to 15 minutes, and then introduced into a coagulation liquid composed of a non-solvent with respect to the polymer component. The cast film (film-shaped polymer solution), when being maintained under the above conditions, may give a porous layer which has a uniform and highly continuous porous structure. This is probably because, by maintaining under humid conditions, water migrates into the film from surface to inside thereof and thereby efficiently promotes the phase separation of the polymer solution. The cast film is particularly preferably maintained at a temperature of from 30° C. to 80° C. and relative humidity of from 90% to 100% and most preferably maintained at a temperature of from 40° C. to 70° C. and relative humidity of about 100% (e.g., from 95% to 100%). If the cast film is placed under conditions of atmospheric humidity of less than the above range, the resulting porous layer may suffer from a trouble of insufficient rate of surface pore area.

The above process allows the formation of a porous layer having a multiplicity of continuous micropores with an average pore size of from 0.01 to 10 µm. The pore size of micropores, porosity, and rate of surface pore area of the porous layer constituting the porous film assembly may be regulated to desired values by choosing or setting conditions such as types and amounts of components of the polymer solution, amount of water, and humidity, temperature, and time of casting.

The coagulation liquid for use in the phase conversion process has only to be a solvent that coagulates the polymer component and may be suitably selected according to the type of a polymer used as the polymer component. For example, when the polymer is a polyamideimide or polyamic acid, the coagulation liquid has only to be a solvent that coagulates the polyamideimide or polyamic acid, and examples thereof include water; alcohols including monohydric alcohols such as methanol and ethanol, and polyhydric alcohols such as glycerol; water-soluble polymers such as polyethylene glycols; mixtures of them; and other water-soluble coagulation liquids.

In the production process, a porous film assembly structurally including the substrate, and the porous layer directly arranged on a surface of the substrate is produced by introducing the cast film into a coagulation liquid to form a porous layer on the surface of the substrate, and subjecting the article directly to drying. The drying process is not limited, as long as being a process capable of removing the solvent component such as the coagulation liquid, and may be performed with heating or performed as natural drying at room temperature. The heating may be performed by any process or treatment that can control the temperature of the porous film assembly to a predetermined temperature, such as hot-air treatment, hot-roll treatment, or placing typically in a thermostat or oven. The heating temperature may be chosen within a wide range of from around room temperature to around 600° C. The heating may be performed in an air atmosphere or in an atmosphere of nitrogen gas or an inert gas. The use of air is most inexpensive in cost, but may invite an oxidation reaction. To avoid this, nitrogen gas or an inert gas is preferably used, of which nitrogen is advantageous in view of cost. The heating conditions may be suitably determined in consideration typically of productivity and properties of the porous layer and the substrate. After drying, a porous film assembly including the substrate and, present directly on a surface thereof, the porous layer is obtained.

The preparation of an electric wiring on the surface of the porous layer of the porous film assembly may be performed typically by plating, printing, or etching, as above.

[Optically Transparent Sealant]

Sealing or encapsulating of optical semiconductor devices requires optically transparent sealants which excel in optical transparency, thermal stability, moisture resistance, adhesion, and cracking resistance. The cationically polymerizable resin composition according to the present invention has these properties and is advantageously usable as an optically transparent sealant for the sealing of optical semiconductor devices.

[Nanoimprinting Working]

A working process using a nanoimprinting technology is a technology which enables high-speed, inexpensive production of a fine structure having a pattern on the order of nanometers and which includes shorter steps with excellent productivity, and is thereby employed advantageously.

More specifically, the nanoimprinting working is a technology in which a pattern is transferred by applying a photo-curable composition to a base or substrate, stamping an imprinting stamp (also called typically "mold" or "plate") bearing a fine pattern onto the applied composition, and exposing and curing the stamped composition. Specifically, the nanoimprinting working includes the following steps:

Step 1: Applying a photo-curable resin composition to a substrate to form an uncured film thereon;

Step 2: Heating the uncured film (film material) to a temperature of from the glass transition temperature (Tg) of the resin composition to around the softening point thereof to soften the resin, and at this time point, stamping an imprinting stamp bearing a fine pattern onto the softened resin to transfer the pattern thereto Step 3: Subjecting the film material bearing the transferred fine pattern to cooling or photo-curing Step 4: Removing the imprinting stamp and thereby obtaining an imprinted fine structure In an embodiment, a cationically polymerizable resin composition according to the present invention can give a fine structure through nanoimprinting working. The cationically polymerizable resin composition for nanoimprinting working use may further contain customarily known additives according to necessity, such as photosensitizers, resins, adhesion improvers, reinforcers, softeners, plasticizers, viscosity modifiers, and solvents.

The cationically polymerizable resin composition according to the present invention rapidly cures upon irradiation with light and thereby shows high productivity. The composition gives a cured object from which an imprinting stamp can be easily removed, because the cured object is flexible and can satisfactorily bend upon the removal of the imprinting stamp. In addition, the resin composition can give a fine structure bearing a fine pattern on the order of nanometers, which fine pattern has been reproduced in exact, because the cured object obtained therefrom can recover its original shape upon removal of the imprinting stamp. The resulting fine structure excels in properties of optical transparency and thermal stability.

EXAMPLES

The present invention will be illustrated in further detail with reference to several working examples below. It should be noted, however, that these examples are never construed to limit the scope of the present invention.

Synthesis Example 1

A mixture (280 ml) of 24.9 g (0.23 mol) of sodium carbonate with toluene was raised in temperature to 95° C., 1.4 g of propionic acid was added, and, while maintaining the temperature at 95° C., 16 g of vinyl acetate was added dropwise, and 15 minutes later, 1.27 g (1.9 mmol) of di-μ-chlorobis(1,5-cyclooctadiene)diiridium(I) [Ir(cod)Cl]$_2$ was further added. Next, 40 g (0.19 mol) of oxetane-3,3-dimethanol was added dropwise over 3 hours for a reaction. After the completion of the dropwise addition and subsequent stirring for 1 hour, the reaction mixture was analyzed by gas chromatography and found that there were formed 3,3-bis(vinyloxymethyl)oxetane represented by the following formula in a yield of 90% and (3-vinyloxymethyloxetan-3-yl)methanol in a yield of 2%. The reaction mixture was purified by distillation and thereby yielded 31 g of 3,3-bis(vinyloxymethyl)oxetane with a purity of 99%.

$^1$H-NMR (CDCl$_3$) δ: 6.5 (2H, dd), 4.53 (4H, s), 4.2 (2H, d), 4.05 (2H, d), 3.93 (4H, s)

[Chem. 16]

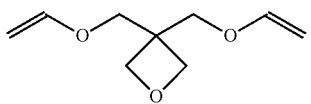

Synthesis Example 2

To toluene (500 g) were added 3-chloromethyl-3-ethyloxetane (0.1 mol), 1,4-cyclohexanediol (0.5 mol), and tetrabutylammonium bromide (0.01 mol). After being raised in temperature to 90° C., the mixture was combined with a 5 N NaOH aqueous solution (100 g) added dropwise, followed by stirring for 5 hours. A toluene solution (toluene layer) was rinsed with water, concentrated, purified by silica gel chromatography, and thereby yielded 4-(3-ethyloxetan-3-yl-methoxy)cyclohexanol with a purity of 99%.

Independently, a mixture (100 ml) of sodium carbonate (0.06 mol) with toluene was raised in temperature to 95° C. While maintaining the temperature at 95° C., 4.2 g of vinyl acetate was added dropwise, and 15 minutes later, di-μ-chlorobis(1,5-cyclooctadiene)diiridium(I) [Ir(cod)Cl]$_2$ (0.5 mmol) was added. Next, 4-(3-ethyloxetan-3-yl-methoxy)cyclohexanol (0.05 mol) was added dropwise over 2 hours, followed by performing a reaction in a nitrogen atmosphere while adding 12.6 g of vinyl acetate dropwise and maintaining the reaction temperature at 95° C. After the completion of the dropwise addition and subsequent stirring for 1 hour, the reaction mixture was analyzed by gas chromatography and found that there was formed 3-ethyl-3-(4-vinyloxycyclohexyloxymethyl)oxetane represented by following formula in a yield of 92%. This was subjected to a $^1$H-NMR (CDCl$_3$) measurement and found that signals specific to vinyl group were observed at 6.5 ppm, 4.2 ppm, and 4.04 ppm, as in Synthesis Example 1.

[Chem. 17]

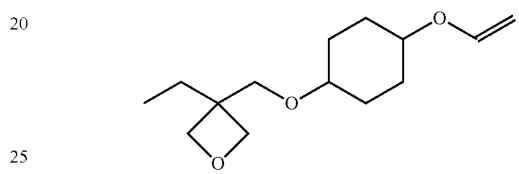

Synthesis Example 3

Epoxidation of 12.6 g (0.1 mol) of (4-methylcyclohex-3-enyl)methanol was performed with a 5 percent by weight solution of peroxyacetic acid in ethyl acetate at 65° C. The epoxidized product was purified by distillation and thereby yielded 12 g of (6-methyl-7-oxabicyclo[4.1.0]hept-3-yl)methanol with a purity of 98%.

Independently, a mixture (100 ml) of sodium carbonate (0.06 mol) with toluene was raised in temperature to 95° C. While maintaining the temperature at 95° C., 4.2 g of vinyl acetate was added dropwise, and, 15 minutes later, di-μ-chlorobis(1,5-cyclooctadiene)diiridium(I) [Ir(cod)Cl]$_2$ (0.5 mmol) was added. Next, (6-methyl-7-oxabicyclo[4.1.0]hept-3-yl)methanol (0.05 mol) was added dropwise over 2 hours, followed by performing a reaction in a nitrogen atmosphere while adding 12.6 g of vinyl acetate dropwise and maintaining the reaction temperature at 95° C. After the completion of dropwise addition and subsequent stirring for 1 hour, the reaction mixture was analyzed by gas chromatography and found that 1-methyl-4-vinyloxy-7-oxabicyclo[4.1.0]heptane represented by the following formula was formed in a yield of 95%. This was subjected to a $^1$H-NMR (CDCl$_3$) measurement and found that signals specific to vinyl group were observed at 6.5 ppm, 4.2 ppm, and 4.05 ppm, as in Synthesis Example 1.

[Chem. 18]

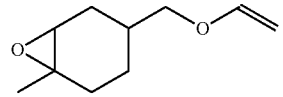

Synthesis Example 4

To toluene (500 g) were added 4-chloromethylcyclohexene (0.1 mol), 1,4-cyclohexanediol (0.5 mol), and tetrabutylammonium bromide (0.01 mol), the mixture was raised in temperature to 90° C., and a 5 N NaOH aqueous solution (100 g) was added dropwise thereto, followed by stirring for 5 hours. A toluene solution (toluene layer) was rinsed with water, concentrated, purified by silica gel chromatography, and thereby yielded 13 g of 4-(cyclohex-3-enylmethoxy)cyclohexanol with a purity of 99%.

The prepared 4-(cyclohex-3-enylmethoxy)cyclohexanol was epoxidized by the procedure of Synthesis Example 3 and thereby yielded 8 g of 4-(7-oxabicyclo[4.1.0]hept-3-ylmethoxy)cyclohexanol.

Next, vinyl-etherification was performed by the procedure of Synthesis Example 3, except for using the above-prepared 4-(7-oxabicyclo[4.1.0]hept-3-ylmethoxy)cyclohexanol instead of (6-methyl-7-oxabicyclo[4.1.0]hept-3-yl)methanol, and thereby synthetically yielded 3-(4-vinyloxycyclohexyloxymethyl)-7-oxabicyclo[4.1.0]heptane represented by the following formula. This was subjected to a $^1$H-NMR (CDCl$_3$) measurement and found that signals specific to vinyl group were observed at 6.5 ppm, 4.2 ppm, and 4.04 ppm, as in Synthesis Example 1.

[Chem. 19]

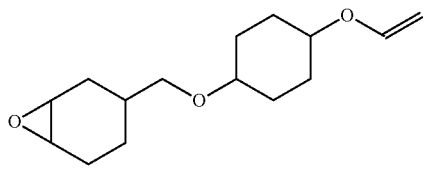

Synthesis Example 5

In a five-necked flask equipped with a monomer dropping line, an initiator dropping line, a thermometer, a reflux condenser, and stirring blades was placed 25% of a mixture (monomer mixture) of 333.20 g of 1-methoxy-2-acetoxypropane (PGMEA) and 541.63 g (2.76 mol) of 3,4-epoxycyclohexylmethyl methacrylate (CYCLOMER M100, supplied by Daicel Corporation), followed by heating to 85±1° C. Next, a mixture of 0.7 g of the trade name "PERBUTYL PV" (t-butyl peroxypivalate) and 7.0 g of PGMEA was charged, stirred to be mixed uniformly, and, to the resulting mixture with stirring, the remaining 75% of the monomer mixture and a mixture (initiator solution 1) of 4.90 g of AIBN (azobisisobutyronitrile) and 70.00 g of PGMEA were simultaneously added dropwise each over 5 hours using delivery pumps. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a white powdery resin (1).

The resin (1) had a number-average molecular weight (Mn) of 10500 and a weight-average molecular weight (Mw) of 25800 as molecular weights in terms of polystyrene measured by gel permeation chromatography (GPC). This resin was solid at 0° C.

Synthesis Example 6

In a five-necked flask equipped with a monomer dropping line, an initiator dropping line, a thermometer, a reflux condenser, and stirring blades was placed 25% of a mixture (monomer mixture) of 333.20 g of PGMEA and 502.92 g (2.76 mol) of 3,4-epoxycyclohexylmethyl acrylate (CYCLOMER A200, supplied by Daicel Corporation), followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a colorless, transparent resin (2).

The resin (2) had a Mn of 15600 and a Mw of 38200 as molecular weights measured by GPC. This resin was solid at 0° C.

Synthesis Example 7

In a five-necked flask equipped with a monomer dropping line, an initiator dropping line, a thermometer, a reflux condenser, and stirring blades was placed 25% of a mixture (monomer mixture) of 166.60 g of PGMEA, 90.23 g (0.46 mol) of CYCLOMER M100, and 327.05 g (2.30 mol) of n-butyl methacrylate (BMA), followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a colorless, transparent resin (3).

The resin (3) had a Mn of 16800 and a Mw of 45800 as molecular weights measured by GPC. This resin was solid at 0° C.

Synthesis Example 8

In a five-necked flask equipped with a monomer dropping line, an initiator dropping line, a thermometer, a reflux condenser, and stirring blades was placed 25% of a mixture (monomer mixture) of 166.60 g of PGMEA, 90.23 g (0.46 mol) of CYCLOMER M100, and 294.77 g (2.30 mol) of n-butyl acrylate (BA), followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by reprecipitation from an 8-fold amount of a 60 percent by weight methanol aqueous solution, held in a vacuum dryer (40° C., full vacuum) for 20 hours, and thereby yielded a colorless, transparent liquid resin (4).

The obtained resin (4) had a Mn of 19800 and a Mw of 55800 as molecular weights measured by GPC. This resin remained liquid even at 0° C.

Synthesis Example 9

In a five-necked flask equipped with a monomer dropping line, an initiator dropping line, a thermometer, a reflux condenser, and stirring blades was placed 25% of a mixture (monomer mixture) of 166.60 g of PGMEA, 90.23 g (0.46 mol) of CYCLOMER M100, and 294.77 g (2.30 mol) of n-butyl acrylate (BA), followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 2.50 g of AIBN and 70.00 g of PGMEA were simultaneously added dropwise using delivery pumps each over 5 hours. Immediately after the completion of dropwise addition, 50% of a mixture (initiator solution 2) of 1.5 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by reprecipitation from an 8-fold amount of a 60 percent by weight methanol aqueous solution, held in a vacuum dryer (40° C., full vacuum) for 20 hours, and thereby yielded a colorless, transparent liquid resin (5).

The obtained resin (5) had a Mn of 45800 and a Mw of 11800 as molecular weights measured by GPC. This resin remained liquid even at 0° C.

Synthesis Example 10

In a five-necked flask equipped with a monomer dropping line, an initiator dropping line, a thermometer, a reflux condenser, and stirring blades was placed 25% of a mixture (monomer mixture) of 166.60 g of PGMEA, 83.82 g (0.46 mol) of CYCLOMER A200, and 294.77 g (2.30 mol) of BA, followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a colorless, transparent liquid resin (6).

The obtained resin (6) had a Mn of 17300 and a Mw of 52100 as molecular weights measured by GPC. This resin remained liquid even at 0° C.

Synthesis Example 11

In a five-necked flask equipped with a monomer dropping line, an initiator dropping line, a thermometer, a reflux condenser, and stirring blades was placed 25% of a mixture (monomer mixture) of 166.60 g of PGMEA, 65.39 g (0.46 mol) of glycidyl methacrylate (GMA), and 294.77 g (2.30 mol) of BA, followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a colorless, transparent liquid resin (7).

The obtained resin (7) had a Mn of 19300 and a Mw of 52300 as molecular weights measured by GPC. This resin remained liquid even at 0° C.

Synthesis Example 12

In a five-necked flask equipped with a monomer dropping line, an initiator dropping line, a thermometer, a reflux condenser, and stirring blades was placed 25% of a mixture (monomer mixture) of 166.60 g of PGMEA, 58.94 g (0.46 mol) of glycidyl acrylate (GA), and 294.77 g (2.30 mol) of BA, followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a colorless, transparent liquid resin (8).

The obtained resin (8) had a Mn of 16300 and a Mw of 45300 as molecular weights measured by GPC. This resin remained liquid even at 0° C.

Synthesis Example 13

In a five-necked flask equipped with a monomer dropping line, an initiator dropping line, a thermometer, a reflux condenser, and stirring blades was placed 25% of a mixture (monomer mixture) of 166.60 g of PGMEA, 84.75 g (0.46 mol) of 3-ethyl-3-oxetanylmethyl methacrylate (OXE-30, supplied by Osaka Organic Chemical Industry Ltd.), and 294.77 g (2.30 mol) of BA, followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a colorless, transparent liquid resin (9).

The obtained resin (9) had a Mn of 20800 and a Mw of 54300 as molecular weights measured by GPC. This resin remained liquid even at 0° C.

Synthesis Example 14

In a five-necked flask equipped with a monomer dropping line, an initiator dropping line, a thermometer, a reflux condenser, and stirring blades was placed 25% of a mixture (monomer mixture) of 166.60 g of PGMEA, 78.29 g (0.46 mol) of 3-ethyl-3-oxetanylmethyl acrylate (OXE-10, supplied by Osaka Organic Chemical Industry Ltd.), and 294.77 g (2.30 mol) of BA, followed by heating to 85±1° C. Next, a mixture of 0.7 g of PERBUTYL PV and 7.0 g of PGMEA was charged, stirred to be mixed uniformly, and, to the resulting mixture with stirring, the remaining 75% of the monomer mixture and a mixture (initiator solution 1) of 4.90 g of AIBN and 70.00 g of PGMEA were simultaneously added dropwise using delivery pumps each over 5 hours. Immediately after the completion of dropwise addition, 50% of a mixture (initiator solution 2) of 2.8 g of AIBN and 14.00 g of PGMEA was charged, and the remaining 50% of the initiator solution 2 was charged 1 hour later. After being held for further 2 hours, the resulting mixture was cooled to 40° C. or lower and thereby yielded a resin composition. This was diluted two-fold with PGMEA, purified by precipitation from an 8-fold amount of a 60 percent by weight methanol aqueous solution, held in a vacuum dryer (40° C., full vacuum) for 20 hours, and thereby yielded a colorless, transparent resin (10).

The obtained resin (10) had a Mn of 18900 and a Mw of 48300 as molecular weights measured by GPC. This resin remained liquid even at 0° C.

Examples and Comparative Examples

Preparation of Cationically Polymerizable Resin Compositions

A series of cationically polymerizable resin compositions was prepared by mixing and dissolving an oxetane-ring-containing vinyl ether compound (A) or an alicyclic-epoxy-containing vinyl ether compound (B) with an oligomer or polymer (C) having a molecular weight of 500 or more, a monofunctional oxetane compound (D), and a photo-induced cationic polymerization initiator (Irgacure 250), in the compositions and amounts given in Tables 1 to 4. Numerals in the tables are indicated in part by weight.

Symbols in Tables 1 to 4 represent the following compounds:
A1: 3,3-Bis(vinyloxymethyl)oxetane obtained in Synthesis Example 1
A2: 3-Ethyl-3-(4-vinyloxycyclohexyloxymethyl)oxetane obtained in Synthesis Example 2
B1: 1-Methyl-4-vinyloxy-7-oxabicyclo[4.1.0]heptane obtained in Synthesis Example 3
B2: 3-(4-Vinyloxycyclohexyloxymethyl)-7-oxabicyclo [4.1.0]heptane obtained in Synthesis Example 4
X: 1,4-Cyclohexanedimethanol divinyl ether (supplied by Sigma-Aldrich Corporation)
C1: Resin (1) obtained in Synthesis Example 5
C2: Resin (2) obtained in Synthesis Example 6
C3: Resin (3) obtained in Synthesis Example 7
C4: Resin (4) obtained in Synthesis Example 8
C5: Resin (5) obtained in Synthesis Example 9
C6: Resin (6) obtained in Synthesis Example 10
C7: Resin (7) obtained in Synthesis Example 11
C8: Resin (8) obtained in Synthesis Example 12
C9: Resin (9) obtained in Synthesis Example 13
C10: Resin (10) obtained in Synthesis Example 14
C11: Partially epoxidized polybutadiene having hydroxyl groups at both ends (PB3600, supplied by Daicel Corporation)
D1: 3-Ethyl-3-(2-ethylhexyloxymethyl)oxetane (OXT-212, supplied by Toagosei Co., Ltd.)
Irgacure 250: 3:1 Mixture (Irgacure 250, supplied by Ciba Japan) of iodonium (4-methylphenyl)[4-(2-methylpropyl) phenyl]hexafluorophosphate and propylene carbonate (Formation of Cured Objects)

Each of the compositions was applied to a thickness of about 100 μm to a fluorine-coated PET film as a substrate using an applicator, irradiated with an ultraviolet ray using a belt-conveyer type ultraviolet ray irradiator (UVC-02516S1AA02, supplied by Ushio Inc.), and thereby yielded a series of cured objects. In this process, an irradiation energy was about 2 J (wavelength: 320-390 nm). The cured objects after the ultraviolet ray irradiation were each subjected to a heat treatment at 200° C. in the atmosphere for 1 hour.

(Evaluation of Bendability)

Each of the cured objects 100 μm thick obtained in the examples and comparative examples was placed around a rod with a diameter of 2 mm, whether the sample showed cracks (cracking) or not was visually observed, and the bendability of the samples was evaluated according to the following criteria.

Evaluation Criteria: A sample showing no cracks (cracking) is evaluated as "passed (P)", and a sample showing cracks (cracking) is evaluated as "failure (F)".

(Pyrolysis Temperature)

Each of the cured objects obtained in the examples and comparative examples was subjected to thermogravimetry. With reference to FIG. 1, a temperature at the point, where the tangent line of a region with no weight loss or gradual weight loss in early stages of temperature rise intersects with the tangent line of the inflection point of a region with abrupt weight loss, is defined as a temperature T, and the pyrolysis temperatures of the samples were evaluated according to the following criteria.

Evaluation Criteria: A sample having a temperature T of 250° C. or higher is evaluated as "passed (P)", and a sample having a temperature T of lower than 250° C. is evaluated as "failure (F)".

(Evaluation of Post-Heat-Treatment Bendability)

Each of the cured objects 100 μm thick obtained in the examples and comparative examples was subjected to a heating treatment in an oven at 200° C. for 1 hour, and this was placed around a rod with a diameter of 2 mm, whether the sample showed cracks (cracking) or not was visually observed, and the post-heat-treatment bendability of the samples was evaluated according to the following criteria.

Evaluation Criteria: A sample showing no cracks (cracking) is evaluated as "passed (P)", and a sample showing cracks (cracking) is evaluated as "failure (F)".

TABLE 1

| | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Cationically polymerizable resin composition | A1 | 20 | 20 | 20 | 20 | 20 | 20 | 20 | 20 | 20 | 20 | 20 | 20 | 20 | 20 |
| | A2 | | | | | | | | | | | | | | |
| | B1 | | | | | | | | | | | | | | |
| | B2 | | | | | | | | | | | | | | |
| | X | | | | | | | | | | | | | | |
| | C1 | | | | | | | | | | | | | | |
| | C2 | | | | | | | | | | | | | | |
| | C3 | | | | | | | | | | | | | | |
| | C4 | 80 | | | | | | | 80 | | | | | | |
| | C5 | | 80 | | | | | | | 80 | | | | | |
| | C6 | | | 80 | | | | | | | 80 | | | | |
| | C7 | | | | 80 | | | | | | | 80 | | | |
| | C8 | | | | | 80 | | | | | | | 80 | | |
| | C9 | | | | | | 80 | | | | | | | 80 | |
| | C10 | | | | | | | 80 | | | | | | | 80 |
| | C11 | | | | | | | | | | | | | | |
| | D1 | | | | | | | | 20 | 20 | 20 | 20 | 20 | 20 | 20 |
| | Irgacure 250 | 3 | 3 | 3 | 3 | 3 | 3 | 3 | 3 | 3 | 3 | 3 | 3 | 3 | 3 |
| Evaluation | Bendability | P | P | P | P | P | P | P | P | P | P | P | P | P | P |
| | Pyrolysis temperature | P | P | P | P | P | P | P | P | P | P | P | P | P | P |
| | Post-heat-treatment bendability | P | P | P | P | P | P | P | P | P | P | P | P | P | P |

| | | Examples | | | | | | | | | | | | | |
|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| Cationically polymerizable resin composition | A1 | | | | | | | | | | | | | | |
| | A2 | 20 | 20 | 20 | 20 | 20 | 20 | 20 | 20 | 20 | 20 | 20 | 20 | 20 | 20 |
| | B1 | | | | | | | | | | | | | | |
| | B2 | | | | | | | | | | | | | | |
| | X | | | | | | | | | | | | | | |
| | C1 | | | | | | | | | | | | | | |
| | C2 | | | | | | | | | | | | | | |
| | C3 | | | | | | | | | | | | | | |
| | C4 | 80 | | | | | | | 80 | | | | | | |
| | C5 | | 80 | | | | | | | 80 | | | | | |
| | C6 | | | 80 | | | | | | | 80 | | | | |
| | C7 | | | | 80 | | | | | | | 80 | | | |
| | C8 | | | | | 80 | | | | | | | 80 | | |
| | C9 | | | | | | 80 | | | | | | | 80 | |
| | C10 | | | | | | | 80 | | | | | | | 80 |
| | C11 | | | | | | | | | | | | | | |
| | D1 | | | | | | | | 20 | 20 | 20 | 20 | 20 | 20 | 20 |
| | Irgacure 250 | 3 | 3 | 3 | 3 | 3 | 3 | 3 | 3 | 3 | 3 | 3 | 3 | 3 | 3 |
| Evaluation | Bendability | P | P | P | P | P | P | P | P | P | P | P | P | P | P |
| | Pyrolysis temperature | P | P | P | P | P | P | P | P | P | P | P | P | P | P |
| | Post-heat-treatment bendability | P | P | P | P | P | P | P | P | P | P | P | P | P | P |

TABLE 2

| | | Examples | | | | | | | | | | | | | |
|---|---|---|---|---|---|---|---|---|---|---|---|---|---|---|---|
| | | 29 | 30 | 31 | 32 | 33 | 34 | 35 | 36 | 37 | 38 | 39 | 40 | 41 | 42 |
| Cationically polymerizable resin composition | A1 | | | | | | | | | | | | | | |
| | A2 | | | | | | | | | | | | | | |
| | B1 | 20 | 20 | 20 | 20 | 20 | 20 | 20 | 20 | 20 | 20 | 20 | 20 | 20 | 20 |
| | B2 | | | | | | | | | | | | | | |
| | X | | | | | | | | | | | | | | |
| | C1 | | | | | | | | | | | | | | |
| | C2 | | | | | | | | | | | | | | |
| | C3 | | | | | | | | | | | | | | |
| | C4 | 80 | | | | | | | 80 | | | | | | |
| | C5 | | 80 | | | | | | | 80 | | | | | |
| | C6 | | | 80 | | | | | | | 80 | | | | |

TABLE 2-continued

| | | | | | | | | | | | | | | | |
|---|---|---|---|---|---|---|---|---|---|---|---|---|---|---|---|
| | C7 | | | 80 | | | | | | | 80 | | | | |
| | C8 | | | | 80 | | | | | | | 80 | | | |
| | C9 | | | | | 80 | | | | | | | 80 | | |
| | C10 | | | | | | 80 | | | | | | | | 80 |
| | C11 | | | | | | | | | | | | | | |
| | D1 | | | | | | | | 20 | 20 | 20 | 20 | 20 | 20 | 20 |
| | Irgacure 250 | 3 | 3 | 3 | 3 | 3 | 3 | 3 | 3 | 3 | 3 | 3 | 3 | 3 | 3 |
| Evaluation | Bendability | P | P | P | P | P | P | P | P | P | P | P | P | P | P |
| | Pyrolysis temperature | P | P | P | P | P | P | P | P | P | P | P | P | P | P |
| | Post-heat-treatment bendability | P | P | P | P | P | P | P | P | P | P | P | P | P | P |

| | | Examples | | | | | | | | | | | | | |
|---|---|---|---|---|---|---|---|---|---|---|---|---|---|---|---|
| | | 43 | 44 | 45 | 46 | 47 | 48 | 49 | 50 | 51 | 52 | 53 | 54 | 55 | 56 |
| Cationically polymerizable resin composition | A1 | | | | | | | | | | | | | | |
| | A2 | | | | | | | | | | | | | | |
| | B1 | | | | | | | | | | | | | | |
| | B2 | 20 | 20 | 20 | 20 | 20 | 20 | 20 | 20 | 20 | 20 | 20 | 20 | 20 | 20 |
| | X | | | | | | | | | | | | | | |
| | C1 | | | | | | | | | | | | | | |
| | C2 | | | | | | | | | | | | | | |
| | C3 | | | | | | | | | | | | | | |
| | C4 | 80 | | | | | | | 80 | | | | | | |
| | C5 | | 80 | | | | | | | 80 | | | | | |
| | C6 | | | 80 | | | | | | | 80 | | | | |
| | C7 | | | | 80 | | | | | | | 80 | | | |
| | C8 | | | | | 80 | | | | | | | 80 | | |
| | C9 | | | | | | 80 | | | | | | | 80 | |
| | C10 | | | | | | | 80 | | | | | | | 80 |
| | C11 | | | | | | | | | | | | | | |
| | D1 | | | | | | | | 20 | 20 | 20 | 20 | 20 | 20 | 20 |
| | Irgacure 250 | 3 | 3 | 3 | 3 | 3 | 3 | 3 | 3 | 3 | 3 | 3 | 3 | 3 | 3 |
| Evaluation | Bendability | P | P | P | P | P | P | P | P | P | P | P | P | P | P |
| | Pyrolysis temperature | P | P | P | P | P | P | P | P | P | P | P | P | P | P |
| | Post-heat-treatment bendability | P | P | P | P | P | P | P | P | P | P | P | P | P | P |

TABLE 3

| | | Comparative Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Cationically polymerizable resin composition | A1 | 20 | 20 | 20 | 20 | 20 | 20 | 20 | 20 | | | | | | |
| | A2 | | | | | | | | | 20 | 20 | 20 | 20 | 20 | 20 |
| | B1 | | | | | | | | | | | | | | |
| | B2 | | | | | | | | | | | | | | |
| | X | | | | | | | | | | | | | | |
| | C1 | 80 | | | | 80 | | | | 80 | | | | 80 | |
| | C2 | | 80 | | | | 80 | | | | 80 | | | | 80 |
| | C3 | | | 80 | | | | 80 | | | | 80 | | | |
| | C4 | | | | | | | | | | | | | | |
| | C5 | | | | | | | | | | | | | | |
| | C6 | | | | | | | | | | | | | | |
| | C7 | | | | | | | | | | | | | | |
| | C8 | | | | | | | | | | | | | | |
| | C9 | | | | | | | | | | | | | | |
| | C10 | | | | | | | | | | | | | | |
| | C11 | | | | 80 | | | | 80 | | | | 80 | | |
| | D1 | | | | | 20 | 20 | 20 | | | | | | 20 | 20 |
| | Irgacure 250 | 3 | 3 | 3 | 3 | 3 | 3 | 3 | 3 | 3 | 3 | 3 | 3 | 3 | 3 |
| Evaluation | Bendability | F | F | F | P | F | F | F | P | F | F | F | P | F | F |
| | Pyrolysis temperature | P | P | P | P | P | P | P | P | P | P | P | P | P | P |
| | Post-heat-treatment bendability | F | F | F | F | F | F | F | F | F | F | F | F | F | F |

| | | Comparative Examples | | | | | | | | | | | | |
|---|---|---|---|---|---|---|---|---|---|---|---|---|---|---|
| | | 15 | 16 | 17 | 18 | 19 | 20 | 21 | 22 | 23 | 24 | 25 | 26 | 27 |
| Cationically polymerizable resin composition | A1 | | | | | | | | | | | | | | 
| | A2 | | 20 | 20 | | | | | | | | | | |
| | B1 | | | | 20 | 20 | 20 | 20 | 20 | 20 | 20 | | | |
| | B2 | | | | | | | | | | | 20 | 20 | 20 |
| | X | | | | | | | | | | | | | |
| | C1 | | | 80 | | | 80 | | | 80 | | | | |
| | C2 | | | | 80 | | | 80 | | | 80 | | 80 | |
| | C3 | 80 | | | | 80 | | | 80 | | | | | 80 |

TABLE 3-continued

|  |  |  |  |  |  |  |  |  |  |  |  |  |  |
|---|---|---|---|---|---|---|---|---|---|---|---|---|---|
|  | C4 |  |  |  |  |  |  |  |  |  |  |  |  |
|  | C5 |  |  |  |  |  |  |  |  |  |  |  |  |
|  | C6 |  |  |  |  |  |  |  |  |  |  |  |  |
|  | C7 |  |  |  |  |  |  |  |  |  |  |  |  |
|  | C8 |  |  |  |  |  |  |  |  |  |  |  |  |
|  | C9 |  |  |  |  |  |  |  |  |  |  |  |  |
|  | C10 |  |  |  |  |  |  |  |  |  |  |  |  |
|  | C11 |  | 80 |  |  |  | 80 |  |  |  | 80 |  |  |
|  | D1 | 20 | 20 |  |  |  |  | 20 | 20 | 20 | 20 |  |  |
|  | Irgacure 250 | 3 | 3 | 3 | 3 | 3 | 3 | 3 | 3 | 3 | 3 | 3 | 3 | 3 |
| Evaluation | Bendability | F | P | F | F | F | P | F | F | F | P | F | F | F |
|  | Pyrolysis temperature | P | P | P | P | P | P | P | P | P | P | P | P | P |
|  | Post-heat-treatment bendability | F | F | F | F | F | F | F | F | F | F | F | F | F |

TABLE 4

|  |  | Comparative Examples |  |  |  |  |  |  |  |  |  |  |  |  |  |
|---|---|---|---|---|---|---|---|---|---|---|---|---|---|---|---|
|  |  | 28 | 29 | 30 | 31 | 32 | 33 | 34 | 35 | 36 | 37 | 38 | 39 | 40 | 41 |
| Cationically polymerizable resin composition | A1 |  |  |  |  |  |  |  |  |  |  |  |  |  |  |
|  | A2 |  |  |  |  |  |  |  |  |  |  |  |  |  |  |
|  | B1 |  |  |  |  |  |  |  |  |  |  |  |  |  |  |
|  | B2 | 20 | 20 | 20 | 20 | 20 |  |  |  |  |  |  |  |  |  |
|  | X |  |  |  |  |  | 20 | 20 | 20 | 20 | 20 | 20 | 20 | 20 | 20 |
|  | C1 |  | 80 |  |  |  | 80 |  |  |  |  |  |  |  |  |
|  | C2 |  |  | 80 |  |  |  | 80 |  |  |  |  |  |  |  |
|  | C3 |  |  |  | 80 |  |  |  | 80 |  |  |  |  |  |  |
|  | C4 |  |  |  |  |  |  |  |  | 80 |  |  |  |  |  |
|  | C5 |  |  |  |  |  |  |  |  |  | 80 |  |  |  |  |
|  | C6 |  |  |  |  |  |  |  |  |  |  | 80 |  |  |  |
|  | C7 |  |  |  |  |  |  |  |  |  |  |  | 80 |  |  |
|  | C8 |  |  |  |  |  |  |  |  |  |  |  |  | 80 |  |
|  | C9 |  |  |  |  |  |  |  |  |  |  |  |  |  | 80 |
|  | C10 |  |  |  |  |  |  |  |  |  |  |  |  |  |  |
|  | C11 | 80 |  |  |  | 80 |  |  |  |  |  |  |  |  |  |
|  | D1 |  | 20 | 20 | 20 | 20 |  |  |  |  |  |  |  |  |  |
|  | Irgacure 250 | 3 | 3 | 3 | 3 | 3 | 3 | 3 | 3 | 3 | 3 | 3 | 3 | 3 | 3 |
| Evaluation | Bendability | P | F | F | F | P | F | F | F | P | P | P | P | P | P |
|  | Pyrolysis temperature | P | P | P | P | P | F | F | F | F | F | F | F | F | F |
|  | Post-heat-treatment bendability | F | F | F | F | F | F | F | F | F | F | F | F | F | F |

|  |  | Comparative Examples |  |  |  |  |  |  |  |  |  |  |  |  |
|---|---|---|---|---|---|---|---|---|---|---|---|---|---|---|
|  |  | 42 | 43 | 44 | 45 | 46 | 47 | 48 | 49 | 50 | 51 | 52 | 53 | 54 |
| Cationically polymerizable resin composition | A1 |  |  |  |  |  |  |  |  |  |  |  |  |  |
|  | A2 |  |  |  |  |  |  |  |  |  |  |  |  |  |
|  | B1 |  |  |  |  |  |  |  |  |  |  |  |  |  |
|  | B2 |  |  |  |  |  |  |  |  |  |  |  |  |  |
|  | X | 20 | 20 | 20 | 20 | 20 | 20 | 20 | 20 | 20 | 20 | 20 | 20 | 20 |
|  | C1 |  | 80 |  |  |  |  |  |  |  |  |  |  |  |
|  | C2 |  |  | 80 |  |  |  |  |  |  |  |  |  |  |
|  | C3 |  |  |  | 80 |  |  |  |  |  |  |  |  |  |
|  | C4 |  |  |  |  | 80 |  |  |  |  |  |  |  |  |
|  | C5 |  |  |  |  |  | 80 |  |  |  |  |  |  |  |
|  | C6 |  |  |  |  |  |  | 80 |  |  |  |  |  |  |
|  | C7 |  |  |  |  |  |  |  | 80 |  |  |  |  |  |
|  | C8 |  |  |  |  |  |  |  |  | 80 |  |  |  |  |
|  | C9 |  |  |  |  |  |  |  |  |  | 80 |  |  |  |
|  | C10 | 80 |  |  |  |  |  |  |  |  |  | 80 |  | 80 |
|  | C11 |  | 80 |  |  |  |  |  |  |  |  |  |  |  |
|  | D1 |  |  | 20 | 20 | 20 | 20 | 20 | 20 | 20 | 20 | 20 | 20 | 20 |
|  | Irgacure 250 | 3 | 3 | 3 | 3 | 3 | 3 | 3 | 3 | 3 | 3 | 3 | 3 | 3 |
| Evaluation | Bendability | P | P | F | F | F | P | P | P | P | P | P | P | P |
|  | Pyrolysis temperature | F | F | F | F | F | F | F | F | F | F | F | F | F |
|  | Post-heat-treatment bendability | F | F | F | F | F | F | F | F | F | F | F | F | F |

INDUSTRIAL APPLICABILITY

Cationically polymerizable resin compositions according to embodiments of the present invention each have a low viscosity, are easy to work, and are extremely rapidly curable upon irradiation with light. In addition, they give, through curing, cured objects excellent in flexibility, thermal stability, and post-heat-treatment bendability. The resulting cured objects also excel in optical transparency. They are therefore advantageously usable in the fields of waveguides, optical fibers, base films and protective films for solar cells, base films and protective films for flexible displays, base films and protective films for organic EL devices, optically transparent sealants, adhesives, ink-jet inks, color filters, nanoimprinting, and flexible circuit boards.

The invention claimed is:

1. A cationically polymerizable resin composition comprising a vinyl ether compound (A) containing an oxetane ring and/or a vinyl ether compound (B) containing an alicyclic epoxy group; and an oligomer or polymer (C) having a molecular weight of 500 or more, being liquid at 0° C., and containing at least one structure selected from structures represented by following Formulae (1a), (1b), (1c), (1d), (1e), and (1f):

[Chem. 1]

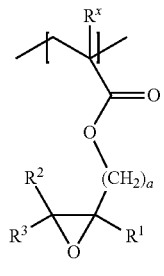
(1a)

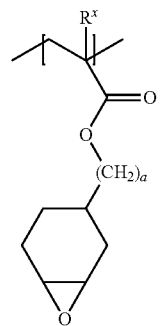
(1b)

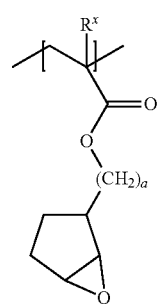
(1c)

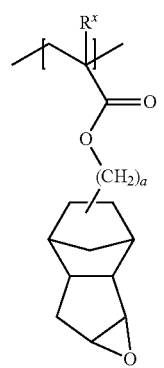
(1d)

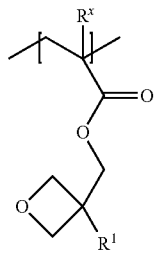
(1e)

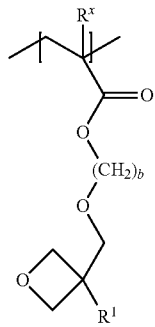
(1f)

wherein $R^x$ represents a hydrogen atom or a methyl group; $R^1$, $R^2$, and $R^3$ each independently represent a hydrocarbon group having 1 to 5 carbon atoms; "a" is an integer of from 0 to 5; and "b" is 1 or 2.

2. The cationically polymerizable resin composition according to claim 1, wherein the oligomer or polymer (C) further contains, in addition to the at least one structure selected from the structures represented by Formulae (1a) to (1f), a structure represented by following Formula (2):

[Chem. 2]

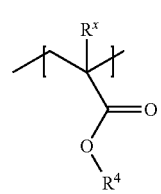
(2)

wherein $R^x$ represents a hydrogen atom or a methyl group; and $R^4$ represents a substituted or unsubstituted hydrocarbon group having 4 or more carbon atoms.

3. The cationically polymerizable resin composition according to claim 1, further comprising a compound (D) having only one functional group selected from epoxy group and oxetanyl group but having neither vinyl ether group nor vinyl polymer chain in the molecule.

4. A cured object obtained by cationic polymerization of the cationically polymerizable resin composition of claim 1.

5. The cured object according to claim 4, which is in the form of a film.

6. The cured object according to claim 4, which is in the form of a fiber.

* * * * *